United States Patent
Gaal et al.

(10) Patent No.: US 10,687,209 B2
(45) Date of Patent: Jun. 16, 2020

(54) UE CAPABILITY CONSTRAINT INDICATIONS FOR HIGH ORDER MODULATION

(71) Applicant: QUALCOMM Incorporated, San Diego, CA (US)

(72) Inventors: Peter Gaal, San Diego, CA (US); Seyedkianoush Hosseini, San Diego, CA (US); Masato Kitazoe, Hachiouji (JP); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/129,564

(22) Filed: Sep. 12, 2018

(65) Prior Publication Data

US 2019/0082317 A1  Mar. 14, 2019

Related U.S. Application Data

(60) Provisional application No. 62/558,329, filed on Sep. 13, 2017.

(51) Int. Cl.
| | |
|---|---|
| *H04W 4/00* | (2018.01) |
| *H04W 8/24* | (2009.01) |
| *H04W 24/10* | (2009.01) |
| *H04W 72/04* | (2009.01) |
| *H04L 27/36* | (2006.01) |
| *H04W 48/16* | (2009.01) |

(Continued)

(52) U.S. Cl.
CPC ............. *H04W 8/24* (2013.01); *H04L 5/0046* (2013.01); *H04L 5/0091* (2013.01); *H04L 27/36* (2013.01); *H04L 27/38* (2013.01); *H04W 24/10* (2013.01); *H04W 48/16* (2013.01); *H04W 72/048* (2013.01); *H04W 72/0453* (2013.01); *H04L 5/001* (2013.01); *H04L 27/34* (2013.01)

(58) Field of Classification Search
CPC ... H04W 8/24; H04W 48/16; H04W 72/0453; H04W 72/048; H04W 24/10; H04L 27/38; H04L 27/36; H04L 5/001; H04L 5/0046; H04L 5/0091; H04L 27/34
USPC ........................................................ 370/329
See application file for complete search history.

(56) References Cited

U.S. PATENT DOCUMENTS

| | | |
|---|---|---|
| 2014/0192732 A1 | 7/2014 | Chen et al. |
| 2016/0270055 A1 | 9/2016 | Larsson et al. |

(Continued)

FOREIGN PATENT DOCUMENTS

| | | |
|---|---|---|
| WO | WO-2017052346 A1 | 3/2017 |

OTHER PUBLICATIONS

International Search Report and Written Opinion—PCT/US2018/050908—ISA/EPO—dated Jan. 3, 2019.

*Primary Examiner* — Mang Hang Yeung
(74) *Attorney, Agent, or Firm* — Holland & Hart LLP

(57) ABSTRACT

Methods, systems, and devices for wireless communications are described that provide for a user equipment (UE) capability indication that indicates one or more constraints associated with a supported modulation order. In some cases, the UE capability indication may indicate that the UE supports a particular modulation order, but has a capacity constraint such that an associated data rate is limited to a data rate associated with a lower modulation order. In some cases, one or more frequency bands may be mapped to a UE constraint.

28 Claims, 17 Drawing Sheets

(51) Int. Cl.
*H04L 27/38* (2006.01)
*H04L 5/00* (2006.01)
H04L 27/34 (2006.01)

(56) References Cited

U.S. PATENT DOCUMENTS

2017/0237524 A1   8/2017  Ahn et al.
2019/0053221 A1*  2/2019  Takahashi ............. H04L 1/0003
2019/0223204 A1*  7/2019  Kim .................. H04W 72/1273

* cited by examiner

UE CAPABILITY CONSTRAINT INDICATIONS FOR HIGH ORDER MODULATION

CROSS REFERENCES

The present Application for patent claims the benefit of U.S. Provisional Patent Application No. 62/558,329 by GAAL et al., entitled "UE CAPABILITY CONSTRAINT INDICATIONS FOR HIGH ORDER MODULATION," filed Sep. 13, 2017, assigned to the assignee hereof, and expressly incorporated by reference herein.

BACKGROUND

The present disclosure relates generally to wireless communication, and more specifically to UE capability constraint indications for high order modulation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, or apparatuses that support UE capability constraint indications for high order modulation. Generally, the described techniques provide for a user equipment (UE) capability indication that indicates one or more constraints associated with a supported modulation order. In some cases, the UE capability indication may indicate that the UE supports a particular modulation order (e.g., 256QAM), but has a capacity constraint such that an associated data rate is limited to a data rate associated with a lower modulation order (e.g., 64QAM). In some examples, one or more frequency bands may be mapped to a UE capability indication, in which one or more frequency bands or combinations of frequency bands may support a first transport block size (TBS), and one or more other frequency bands or combinations of frequency bands may support a second TBS that is smaller than the first TBS. In some cases, the capability indication may indicate that the UE supports a first modulation order for all frequency bands or combinations of frequency bands, with each frequency band or combination of frequency bands constrained to a maximum TBS of a lower modulation order. In some cases, rate matching and soft buffer size may be determined according to either the higher modulation order or the lower modulation order.

A method of wireless communication is described. The method may include identifying a capability of a UE to support communications that are modulated at a first modulation order, determining a UE radio access capability parameter that indicates the first modulation order is supported by the UE and that indicates one or more constraints of the UE for communications modulated at the first modulation order, and transmitting the UE radio access capability parameter to a base station.

An apparatus for wireless communication is described. The apparatus may include means for identifying a capability of a UE to support communications that are modulated at a first modulation order, means for determining a UE radio access capability parameter that indicates the first modulation order is supported by the UE and that indicates one or more constraints of the UE for communications modulated at the first modulation order, and means for transmitting the UE radio access capability parameter to a base station.

Another apparatus for wireless communication is described. The apparatus may include a processor, memory in electronic communication with the processor, and instructions stored in the memory. The instructions may be operable to cause the processor to identify a capability of a UE to support communications that are modulated at a first modulation order, determine a UE radio access capability parameter that indicates the first modulation order is supported by the UE and that indicates one or more constraints of the UE for communications modulated at the first modulation order, and transmit the UE radio access capability parameter to a base station.

A non-transitory computer readable medium for wireless communication is described. The non-transitory computer-readable medium may include instructions operable to cause a processor to identify a capability of a UE to support communications that are modulated at a first modulation order, determine a UE radio access capability parameter that indicates the first modulation order is supported by the UE and that indicates the one or more constraints of the UE for communications modulated at the first modulation order, and transmit the UE radio access capability parameter to a base station.

Some examples of the method, apparatus, and non-transitory computer-readable medium described herein may further include processes, features, means, or instructions for the UE radio access capability parameter indicating the one or more constraints of the UE on one or more frequency bands or combinations of frequency bands.

Some examples of the method, apparatus, and non-transitory computer-readable medium described herein may further include processes, features, means, or instructions for identifying, based at least in part on the one or more constraints of the UE, a first transmission block size (TB S) associated with a second modulation order, the second modulation order being a lower modulation order than the first modulation order.

Some examples of the method, apparatus, and non-transitory computer-readable medium described herein may further include processes, features, means, or instructions for receiving a downlink transmission that may be modulated at the first modulation order. Some examples of the method, apparatus, and non-transitory computer-readable medium described herein may further include processes, features, means, or instructions for demodulating the downlink transmission according to the first modulation order. Some examples of the method, apparatus, and non-transitory computer-readable medium described herein may further include processes, features, means, or instructions for decoding the demodulated downlink transmission based at least in part on the one or more constraints of the UE.

In some examples of the method, apparatus, and non-transitory computer-readable medium described herein, the decoding further comprises identifying a first TBS associated with a second modulation order based at least in part on the one or more constraints of the UE, the second modulation order being a lower modulation order than the first modulation order. Some examples of the method, apparatus, and non-transitory computer-readable medium described herein may further include processes, features, means, or instructions for decoding the demodulated downlink transmission based at least in part on the first TBS. In some examples of the method, apparatus, and non-transitory computer-readable medium described herein, the first modulation order may be 256QAM and the second modulation order may be 64QAM.

Some examples of the method, apparatus, and non-transitory computer-readable medium described herein may further include processes, features, means, or instructions for encoding an uplink transmission using a data rate that may be based at least in part on the one or more constraints of the UE for communications at the first modulation order. Some examples of the method, apparatus, and non-transitory computer-readable medium described herein may further include processes, features, means, or instructions for modulating the uplink transmission according to the first modulation order. Some examples of the method, apparatus, and non-transitory computer-readable medium described herein may further include processes, features, means, or instructions for transmitting the uplink transmission to the base station.

In some examples of the method, apparatus, and non-transitory computer-readable medium described herein, the encoding further comprises identifying a first TBS associated with a second modulation order based at least in part on the one or more constraints of the UE, the second modulation order being a lower modulation order than the first modulation order. Some examples of the method, apparatus, and non-transitory computer-readable medium described herein may further include processes, features, means, or instructions for encoding the uplink transmission based at least in part on the first TBS. In some examples of the method, apparatus, and non-transitory computer-readable medium described herein, the first modulation order may be 256QAM and the second modulation order may be 64QAM.

In some examples of the method, apparatus, and non-transitory computer-readable medium described herein, the one or more constraints indicate that a transport block size associated with a second modulation order may be used for communications with the UE that may be modulated at the first modulation order for all frequency bands and combinations of frequency bands supported by the UE.

In some examples of the method, apparatus, and non-transitory computer-readable medium described herein, the one or more constraints indicate that for a first frequency band, a TBS of a second modulation order may be used for communications with the UE that may be modulated at the first modulation order, and for a second frequency band, a TBS of the first modulation order may be used for communications with the UE that may be modulated at the first modulation order.

In some examples of the method, apparatus, and non-transitory computer-readable medium described herein, the first frequency band may be a millimeter wave frequency band, and the second frequency band may be a lower frequency band than the first frequency band.

Some examples of the method, apparatus, and non-transitory computer-readable medium described herein may further include processes, features, means, or instructions for rating matching a number of bits modulated using the first modulation order within a TBS to a number of bits that can be sent in a resource allocation based at least in part on a first rate matching associated with the first modulation order. Some examples of the method, apparatus, and non-transitory computer-readable medium described herein may further include processes, features, means, or instructions for rating matching a number of bits modulated using the first modulation order within a TBS to a number of bits that can be sent in a resource allocation based at least in part on a second rate matching associated with a lower modulation order than the first modulation order.

Some examples of the method, apparatus, and non-transitory computer-readable medium described herein may further include processes, features, means, or instructions for setting a soft buffer size based at least in part on the first modulation order. Some examples of the method, apparatus, and non-transitory computer-readable medium described herein may further include processes, features, means, or instructions for setting a soft buffer size based at least in part on a lower modulation order than the first modulation order, based at least in part on the one or more constraints of the UE.

A method of wireless communication is described. The method may include receiving from a UE, at a base station, a UE radio access capability parameter that indicates a capability of the UE to support communications that are modulated at a first modulation order and one or more constraints of the UE for communications that are modulated at the first modulation order, encoding a downlink transmission using a data rate that is based at least in part on the one or more constraints of the UE for communications at the first modulation order, modulating the downlink transmission according to the first modulation order, and transmitting the downlink transmission to the UE.

An apparatus for wireless communication is described. The apparatus may include means for receiving from a UE, at a base station, a UE radio access capability parameter that indicates a capability of the UE to support communications that are modulated at a first modulation order and one or more constraints of the UE for communications that are modulated at the first modulation order, means for encoding a downlink transmission using a data rate that is based at least in part on the one or more constraints of the UE for communications at the first modulation order, means for modulating the downlink transmission according to the first modulation order, and means for transmitting the downlink transmission to the UE.

Another apparatus for wireless communication is described. The apparatus may include a processor, memory in electronic communication with the processor, and instructions stored in the memory. The instructions may be operable to cause the processor to receive from a UE, at a base station, a UE radio access capability parameter that indicates a capability of the UE to support communications that are modulated at a first modulation order and one or more constraints of the UE for communications that are modulated at the first modulation order, encode a downlink transmission using a data rate that is based at least in part on the one or more constraints of the UE for communications at the first modulation order, modulate the downlink transmission according to the first modulation order, and transmit the downlink transmission to the UE.

A non-transitory computer readable medium for wireless communication is described. The non-transitory computer-readable medium may include instructions operable to cause a processor to receive from a UE, at a base station, a UE radio access capability parameter that indicates a capability of the UE to support communications that are modulated at a first modulation order and one or more constraints of the UE for communications that are modulated at the first modulation order, encode a downlink transmission using a data rate that is based at least in part on the one or more constraints of the UE for communications at the first modulation order, modulate the downlink transmission according to the first modulation order, and transmit the downlink transmission to the UE.

In some examples of the method, apparatus, and non-transitory computer-readable medium described herein, the encoding further comprises identifying a first TBS associated with a second modulation order based at least in part on the one or more constraints of the UE, the second modulation order being a lower modulation order than the first modulation order. Some examples of the method, apparatus, and non-transitory computer-readable medium described herein may further include processes, features, means, or instructions for encoding the downlink transmission based at least in part on the first TBS. In some examples of the method, apparatus, and non-transitory computer-readable medium described herein, the first modulation order may be 256QAM and the second modulation order may be 64QAM.

Some examples of the method, apparatus, and non-transitory computer-readable medium described herein may further include processes, features, means, or instructions for receiving an uplink transmission that may be modulated at the first modulation order. Some examples of the method, apparatus, and non-transitory computer-readable medium described herein may further include processes, features, means, or instructions for demodulating the uplink transmission according to the first modulation order. Some examples of the method, apparatus, and non-transitory computer-readable medium described herein may further include processes, features, means, or instructions for decoding the demodulated uplink transmission based at least in part on the one or more constraints of the UE.

In some examples of the method, apparatus, and non-transitory computer-readable medium described herein, the decoding further comprises identifying a first TBS associated with a second modulation order based at least in part on the one or more constraints of the UE, the second modulation order being a lower modulation order than the first modulation order. Some examples of the method, apparatus, and non-transitory computer-readable medium described herein may further include processes, features, means, or instructions for decoding the demodulated uplink transmission based at least in part on the first TBS.

In some examples of the method, apparatus, and non-transitory computer-readable medium described herein, the one or more constraints indicate that a transport block size associated with a second modulation order may be used for communications with the UE that may be modulated at the first modulation order. In some examples of the method, apparatus, and non-transitory computer-readable medium described herein, the one or more constraints indicate that for a first frequency band, a TBS of a second modulation order may be used for communications with the UE that may be modulated at the first modulation order, and for a second frequency band, a TBS of the first modulation order may be used for communications with the UE that may be modulated at the first modulation order. In some examples of the method, apparatus, and non-transitory computer-readable medium described herein, the first frequency band may be a millimeter wave frequency band, and the second frequency band may be a lower frequency band than the first frequency band.

DETAILED DESCRIPTION

Figure 1:
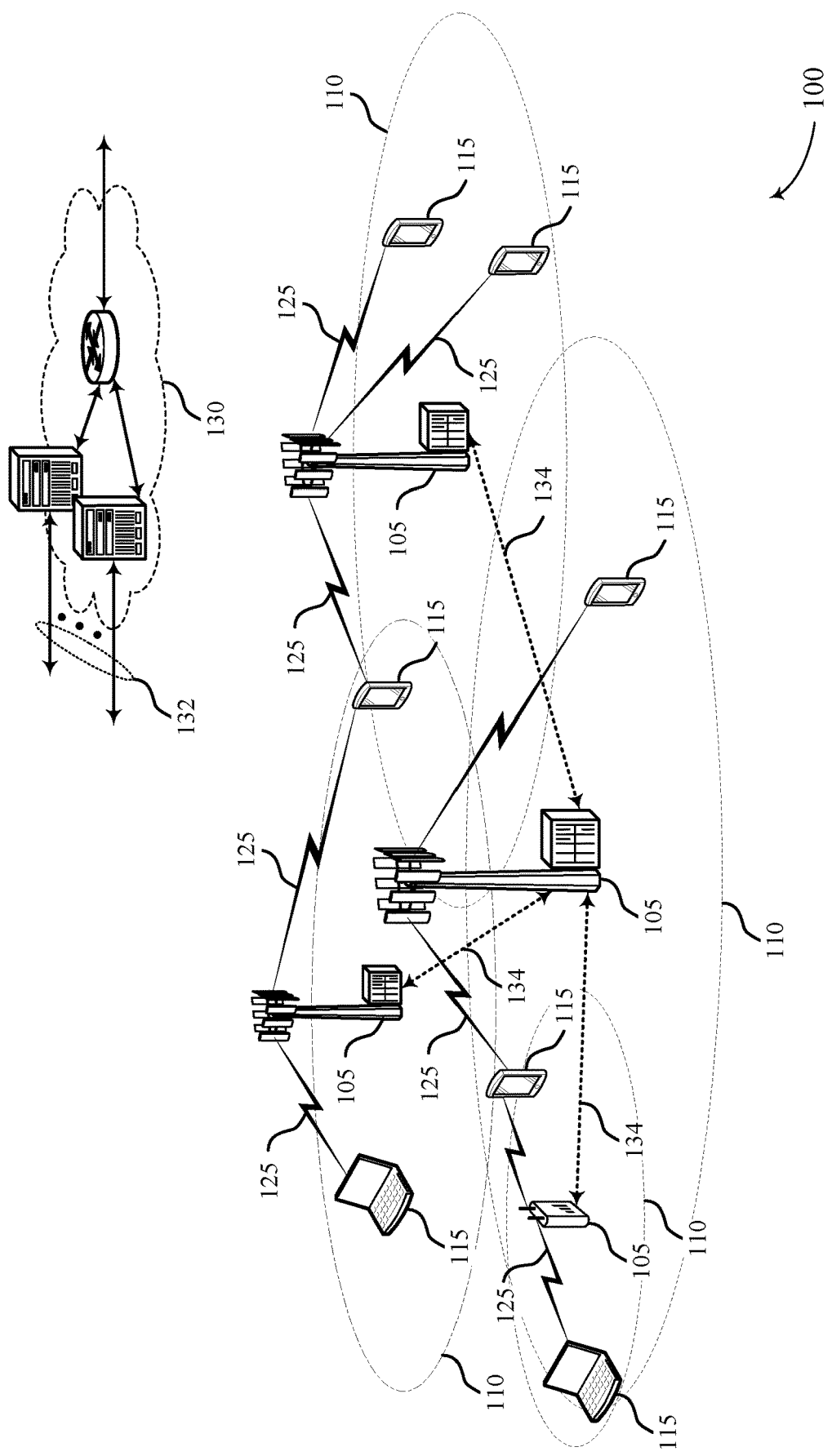
FIG. 1 illustrates an example of a system for wireless communication that supports UE capability constraint indications for high order modulation in accordance with aspects of the present disclosure.

Various described techniques provide for a user equipment (UE) capability indication that indicates one or more constraints associated with a supported modulation order. In some cases, a UE may establish a connection using a high-band component and a low-band component that use wireless channels in different frequency bands. In some cases, the low-band component may be in a lower frequency band than the high-band component, and may be used as an anchor carrier for the UE. In various examples, the high-band component may use relatively high frequency bands, such as millimeter wave (mmW) frequency bands, while the low-band component may use relatively lower frequency bands, such as frequency bands below 6 GHz (which may be referred to as Sub-6 bands).

In some systems, a UE may report its capabilities to a base station, and the base station may configure connections and allocate resources to the UE based at least in part on the reported capabilities. In some cases, reported capabilities may include modulation orders that the UE is capable of supporting, such as a 256QAM (or higher) modulation order. Furthermore, the UE may support communications of various different frequency bands or combinations of frequency bands, and if a modulation order is supported by the UE it implies that the UE is capable of supporting the modulation order in each frequency band or combination of frequency bands. However, in some cases, higher frequency bands may present challenges to transmissions of data at maximum supported data rates of higher modulation orders.

For example, supporting a relatively high transport block size (TBS) using 256QAM in a mmW frequency band may be challenging for a UE due to, for example, a relatively high error vector magnitude (EVM) or receive constellation error (RCE) in higher frequency bands such as a mmW frequency band. In such cases, in order to enhance the likelihood of successfully transmitting and receiving transmissions in higher frequency bands, such a UE may report a modulation order capability based on the highest supported frequency band. Such a UE could, in such cases, support a higher modulation order on lower frequency bands, and thus such capability reporting may result in the UE using a lower modulation order than it is capable of for certain frequency bands or combinations of frequency bands.

Various aspects of the present disclosure provide techniques for UE capability reporting that may indicate one or more constraints on one or more supported frequency bands of combinations of frequency bands. In some cases, a UE may report a capability for a higher modulation order that indicates a constraint on one or more frequency bands. In some examples, a UE may report a modulation order capability (e.g., a "256QAM" capability) that may indicate that there are no constraints on any frequency bands or combinations of frequency bands for the modulation order, and may report a constrained modulation order capability (e.g., a "–256QAM" capability) that indicates constraints on one or more frequency bands or combinations of frequency bands for the modulation order. In some cases, the indication of a constrained modulation order capability may apply to only a subset of frequency bands or combinations of frequency bands, or may apply to all frequency bands. In some cases, an indication of a constrained capability indicates that a maximum TBS for transmissions using the constrained modulation order is limited to a maximum TBS of a lower modulation order (e.g., a maximum TBS of a 64QAM modulation order). Such a constraint on the maximum TBS may reduce a maximum data rate for the constrained frequency bands, which may allow for the spectral efficiency of the higher modulation order but reduce the EVM or RCE impacts associated with the higher frequency bands.

A base station that receives an indication of a constrained modulation order at a UE may, in some cases, encode transmissions to a UE based on a lower modulation order, and modulate the transmissions to the UE at the higher modulation order, for one or more frequency bands or combinations of frequency bands. The UE may receive the transmission, demodulate the transmission according to the higher modulation order, and decode the transmission based on the lower modulation order. Similarly, such techniques may also be used for uplink transmissions, in which a UE may encode transmissions to a base station based on a lower modulation order, and modulate the transmissions to the base station at the higher modulation order, for one or more frequency bands or combinations of frequency bands. The base station may receive the transmission, demodulate the transmission according to the higher modulation order, and decode the transmission based on the lower modulation order.

Aspects of the disclosure are initially described in the context of a wireless communications system. Aspects of the disclosure are further illustrated by and described with reference to apparatus diagrams, system diagrams, and flowcharts that relate to UE capability constraint indications for high order modulation.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices. Devices in wireless communications system 100 may communicate over unlicensed spectrum, which may be a portion of spectrum that includes frequency bands traditionally used by Wi-Fi technology (e.g., technology using IEEE 802.11 communication protocol), such as the 5 GHz band, the 2.4 GHz band, the 60 GHz band, the 3.6 GHz band, and/or the 900 MHz band. The unlicensed spectrum may also include other frequency bands."

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, a wireless terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ Licensed Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to transmission time intervals (TTIs) or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some examples, each served UE 115 may be configured for operating over portions or all of the carrier bandwidth. In some examples, some UEs 115 may report a UE capability that includes a UE 115 modulation order capability. In some cases, some UEs 115 may report a UE capability that indicates one or more constraints associated with a supported modulation order. In some cases, the UE capability indication may indicate that the UE 115 supports a particular modulation order (e.g., 256QAM), but has a capacity constraint such that an associated data rate is limited to a data rate associated with a lower modulation order (e.g., 64QAM).

Figure 2:
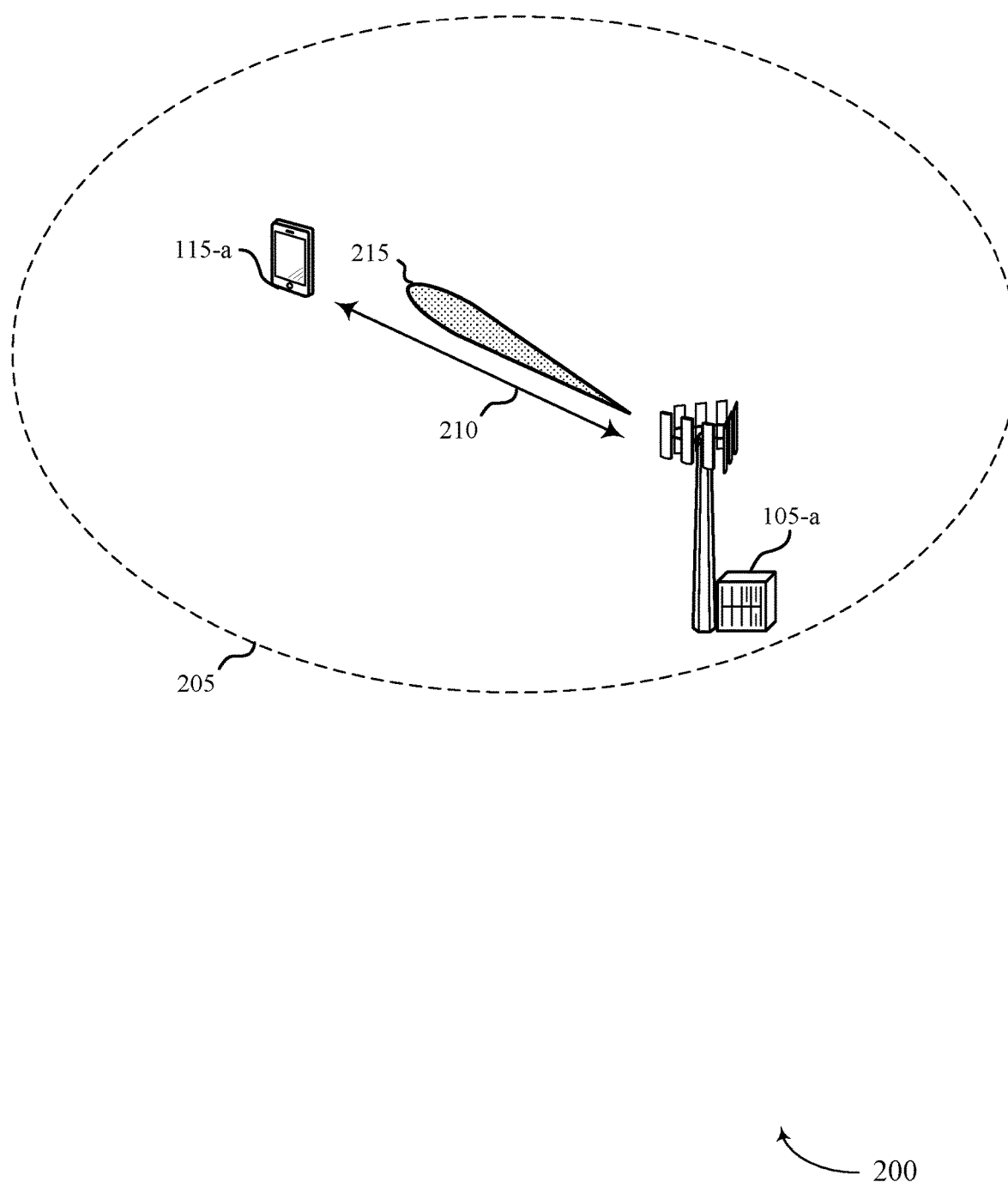
FIG. 2 illustrates an example of a wireless communications system that supports UE capability constraint indications for high order modulation in accordance with aspects of the present disclosure.

FIG. 2 illustrates an example of a wireless communications system 200 that supports UE capability constraint indications for high order modulation in accordance with various aspects of the present disclosure. In some examples, wireless communications system 200 may implement aspects of wireless communications system 100. In the example of FIG. 2, the wireless communications system 200 may include a base station 105, which may be an example of base stations 105 of FIG. 1. The wireless communications system 200 may also include a UE 115, which may be an example of UEs 115 of FIG. 1.

In this example, the base station 105-a may have a geographic coverage area 205, and may establish a first connection 210 with the UE 115-a and a second connection 215 with the UE 115-a. In some cases, the first connection 210 may be an anchor carrier that uses a Sub-6 frequencies, and the second connection 215 may be a high-band connection using beamformed mmW frequencies. Of course, other examples may use different frequency bands, combinations of frequency bands, combinations of carriers, or combinations thereof. As indicated above, in some cases, supporting a relatively high TBS using higher order modulation (e.g., 256QAM) in a higher frequency second connection 215 (e.g., a mmW frequency band connection) may be challenging for the UE 115-a due to, for example, a relatively high EVM or RCE in the higher frequency band. In such cases, in order to enhance the likelihood of successfully transmitting and receiving transmissions on the second connection 215, the UE 115-a may report a modulation order capability, and may also indicate one or more constraints associated with the modulation order capability.

In some cases, the UE 115-a may report a capability for a higher modulation order that indicates a constraint on one or more frequency bands. For example, the UE may report a 256QAM modulation order capability (or any higher order modulation capability, such as 1024QAM, for example) that may indicate that there are no constraints on any frequency bands or combinations of frequency bands for the modulation order. In some cases, such a modulation order capability may correspond to indicating a "256QAM" capability in a UE capability report. In cases where the UE 115-a may have constraints on higher modulation orders, the UE 115-a may report a constrained modulation order capability such as, for example, a "−256QAM" capability (or a "−1024QAM capability, for example) that indicates constraints on one or more frequency bands or combinations of frequency bands for the supported modulation order.

In some cases, the indication of a constrained modulation order capability may apply to only a subset of frequency bands or combinations of frequency bands, or may apply to all frequency bands. In some cases, an indication of a constrained capability indicates that a maximum TBS for transmissions using the constrained modulation order is limited to a maximum TBS of a lower modulation order (e.g., a maximum TBS of a 64QAM modulation order). Such a constraint on the maximum TBS may reduce a maximum data rate for the constrained frequency bands (e.g., mmW frequency bands), which may allow for the spectral efficiency of the higher modulation order but reduce the EVM or RCE impacts associated with the higher frequency bands.

The base station 105-a, upon receiving the indication of a constrained modulation order may encode downlink transmissions to the UE 115-a transmitted in the second connection 215 based on the lower modulation order (e.g., based on a TBS table for 64QAM), and modulate the transmissions to the UE 115-a at the higher modulation order (e.g., 256QAM). The UE 115-a may receive the transmission, demodulate the transmission according to the higher modulation order, and decode the transmission based on the lower modulation order. Similarly, such techniques may also be used for uplink transmissions, in which the UE 115-a may encode transmissions to the base station 105-a based on a lower modulation order, and modulate the transmissions to the base station 105-a at the higher modulation order, for one or more frequency bands or combinations of frequency bands.

In some examples, one or more frequency bands may be mapped to a UE capability indication, in which one or more frequency bands or combinations of frequency bands may support the TBS based on the higher modulation order, and one or more other frequency bands or combinations of frequency bands may support a second TBS that is smaller than the first TBS. For example, if UE 115-a reports a "−256QAM" capability, the base station 105-a may modulate downlink transmissions on the first connection 210 using 256QAM and encode data based on a TBS table for 256QAM. The base station 105-a in such a case may modulate downlink transmissions on the second connection 215 using 256QAM and encode data based on a TBS table for 64QAM. In some cases, such a mapping may be specified for the constrained capability indication. In other cases, the capability indication may indicate that the UE supports a first modulation order for all frequency bands or combinations of frequency bands, with each frequency band or combination of frequency bands constrained to a maximum TBS of a lower modulation order. In some cases, rate matching and soft buffer size may be determined according to either the higher modulation order or the lower modulation order.

Such techniques allow modulation of transmissions according to the higher modulation order, thus providing enhanced spectral efficiency, while also constraining a data rate on certain frequency bands to enhance the likelihood of the receiver successfully receiving the higher frequency band transmission. In some cases, an additional UE capability may be specified in a standard, and may add such a constrained UE capability without an impact of a UE category definition. In some cases, the total number of soft channel bits for a UE category is independent of such an additional UE capability that may be reported.

Figure 3:
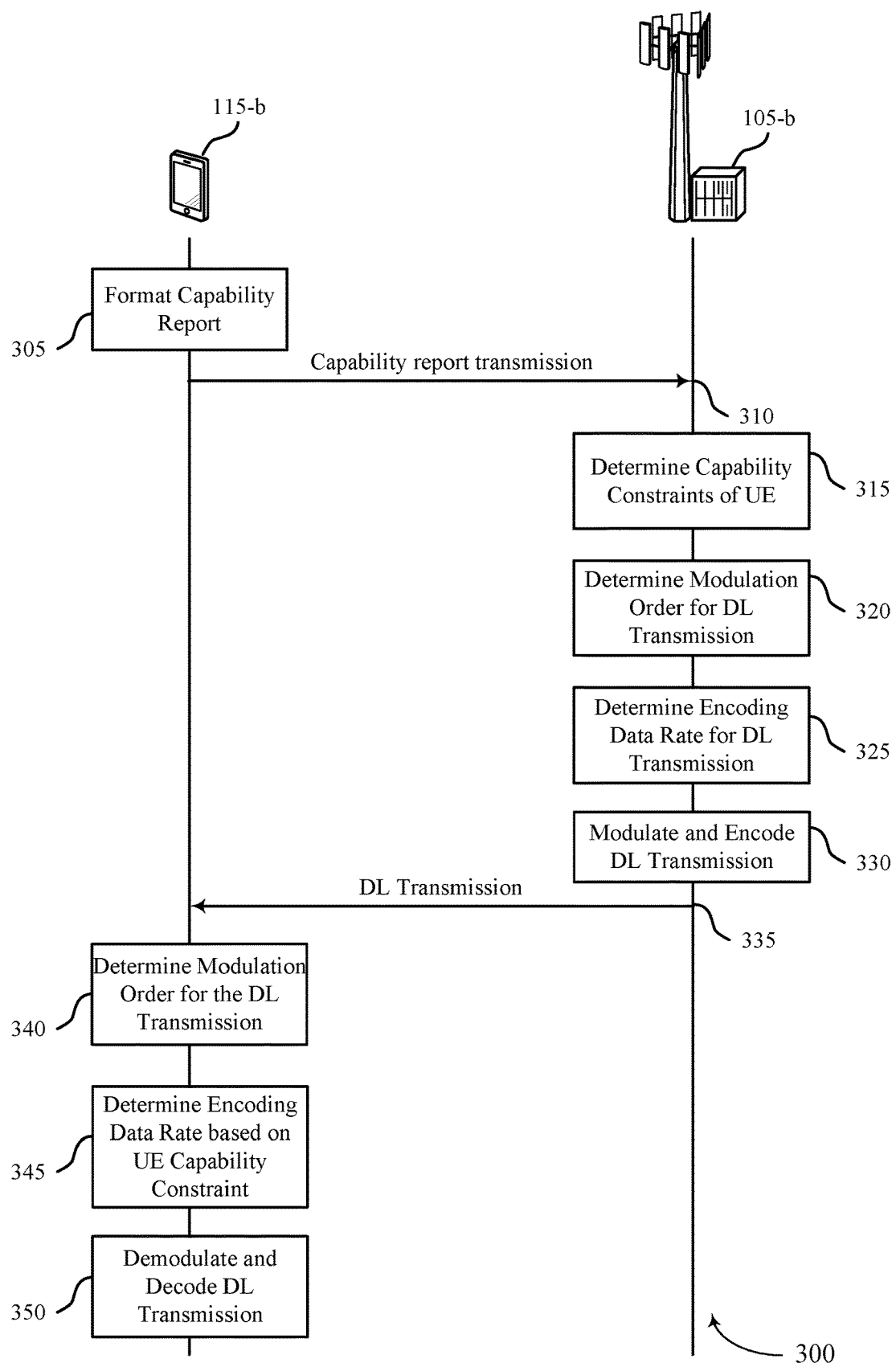
FIG. 3 illustrates an example of a process flow that supports UE capability constraint indications for high order modulation in accordance with aspects of the present disclosure.

FIG. 3 illustrates an example of a process flow 300 that supports UE capability constraint indications for high order modulation in accordance with various aspects of the present disclosure. In some examples, process flow 300 may implement aspects of wireless communications system 100. Process flow 300 may include a base station 105-b, and a UE 115-b, which may be examples of the corresponding devices described with reference to FIG. 1-2.

At block 305, the UE 115-b may format a capability report that is to be transmitted to the base station 105-b. In some cases, the capability report may indicate a number of different capabilities of the UE 115-b. The UE 115-b, in some cases, may report a UE capability that indicates a supported modulation order, and in some cases the indication of the supported modulation order may also indicate one or more constraints for one or more frequency bands or combinations of frequency bands for transmissions at the indicated modulation order. In some examples, when the UE 115-b is unconstrained, it may report a UE capability that indicates the UE 115-b supports a 256QAM modulation order, which may indicate that the UE 115-b supports all TB sizes that may be associated with 256QAM modulation. In cases where the UE 115-b is unable to reliably support higher data rates for the modulation order, the UE 115-b may report a UE capability of "−256QAM" that may indicate constraints on 256QAM transmissions for one or more frequency bands.

The UE 115-b may transmit a capability report transmission 310 to the base station 105-b. In some cases, the capability report transmission 310 may be transmitted in a radio resource control (RRC) message that includes a UE Capability Information radio message. In some cases, the total number of soft channel bits for a UE category is independent of such an additional UE capability that may be reported.

The base station 105-*b* may receive the capability report transmission and may, at block 315, determine UE 115-*b* capabilities and capability constraints. For example, the base station 105-*b* may receive the modulation order indication that indicates a constrained modulation order (e.g., a "–256QAM" modulation order support indication). The base station 105-*b* may determine one or more frequency bands or combinations of frequency bands that are constrained based at least in part on the capability report transmission. In some cases, the UE 115-*b* may declare its constrained capability per frequency band or combination of frequency bands. In some cases, a data rate (e.g., maximum TBS size) for all frequency bands or combinations of frequency bands may be constrained if the UE 115-*b* report a constrained modulation order. In other cases the data rate may be constrained for a subset of frequency bands or combinations of frequency bands. In some cases, the subset of constrained frequency bands or combinations of frequency bands may be mapped to certain modulation orders. Such mapping may be specified in a standard, or may be communicated by the base station 105-*b* in control information.

At block 320, the base station 105-*b* may determine a modulation order for a downlink transmission. The modulation order may be determined based on the modulation orders that the UE 115-*b* is capable of supporting, for example. In some cases, the modulation order for a downlink transmission may be determined for each of one or more carriers or connections between the UE 115-*b* and the base station 105-*b*, such as for a low-band connection, a high-band connection, or any combinations thereof.

At block 325, the base station 105-*b* may determine an encoding data rate for the downlink transmission. The base station 105-*b* may determine the encoding data rate based at least in part on an indication of a constrained data rate from the UE 115-*b*, and a data rate table (e.g., a TBS table) for the determined modulation order, for example. In some cases, the encoding data rate may be selected based on a different modulation order than the modulation order that was determined for the downlink transmission. For example, if the UE 115-*b* indicates a "–256QAM" modulation order is supported, the base station 105-*b* may select a TBS for the downlink transmission based on a 64QAM TBS table when the downlink transmission uses a 256QAM modulation order. In cases where the data rate is constrained based on a frequency band or combination of frequency bands of the downlink transmission, the base station 105-*b* may further select the encoding data rate based at least in part on a frequency band or combination of frequency bands of the downlink transmission.

At block 330, the base station 105-*b* may modulate and encode the downlink transmission. Such modulation and encoding may be performed using established modulation and encoding techniques. In some cases, the base station 105-*b* may perform rate matching to rate match a number of bits modulated using the first modulation order within a TB to a number of bits that can be sent in a resource allocation. In some cases, the rate matching may be based on the modulation order of the downlink transmission. In other cases, the rate matching may be based on the modulation order used for determining the encoding rate for the downlink transmission.

The base station 105-*b*, following the encoding and modulation of the downlink transmission, may transmit the downlink transmission 335 to the UE 115-*b*. The downlink transmission may be transmitted using a frequency band, or combination of frequency bands, that are supported by the UE 115-*b*.

At block 340, the UE 115-*b* may determine the modulation order of the downlink transmission. In some cases, the modulation order may be determined based at least in part on the reported UE capability. In some cases, the modulation order may be identified in a control transmission associated with the downlink transmission 335.

At block 345, the UE 115-*b* may determine an encoding data rate based on the UE capability constraint. In some cases, as discussed above, the encoding data rate may be determined based on a modulation order that is lower than the modulation order used for the downlink transmission. In some cases, the encoding data rate may be determined based at least in part on a TBS table associated with a lower modulation order (e.g., a 64QAM TBS table) than the modulation order (e.g., 256QAM) used for the downlink transmission 335.

At block 350, the UE 115-*b* may demodulate and decode the downlink transmission. The demodulation and decoding of the downlink transmission may be performed using established demodulation and decoding techniques. In some cases, the UE 115-*b* may set a soft buffer size based on the modulation order of the downlink transmission. In other cases, the soft buffer size may be based on the modulation order used for determining the encoding rate for the downlink transmission.

While the example of FIG. 3 shows a downlink transmission that is modulated and encoded according to a supported modulation order and modulation order constraint of the UE 115-*b*, similar techniques may be used for uplink transmissions from the UE 115-*b* to the base station 105-*b*. In such cases, the UE 115-*b* may select the modulation order and encoding data rate based at least in part on the constrained modulation order indicated by the UE 115-*b*, and may transmit the uplink transmission. The base station 105-*b* may receive such an uplink transmission and demodulate and decode the transmission based on the indicated constrained modulation order, using the higher modulation order and encoding rate based on a lower modulation order.

Figure 4:
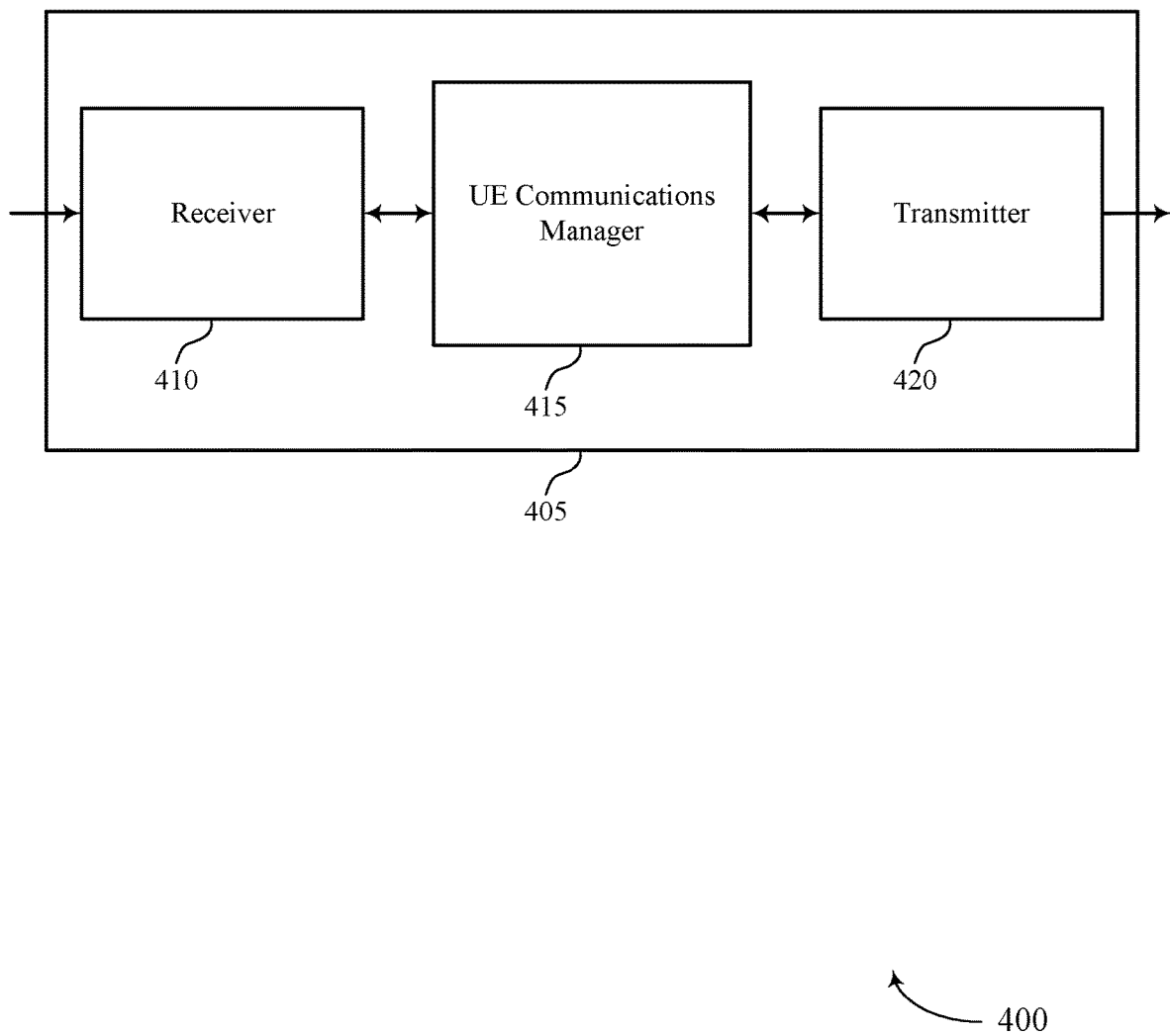
FIGS. 4 through 6 show block diagrams of a device that supports UE capability constraint indications for high order modulation in accordance with aspects of the present disclosure.

FIG. 4 shows a block diagram 400 of a wireless device 405 that supports user equipment (UE) capability constraint indications for high order modulation in accordance with aspects of the present disclosure. Wireless device 405 may be an example of aspects of a UE 115 as described herein. Wireless device 405 may include receiver 410, UE communications manager 415, and transmitter 420. Wireless device 405 may also include a one or more processors, memory coupled with the one or more processors, and instructions stored in the memory that are executable by the one or more processors to enable the one or more processors to perform the UE capability constraint indications for high order modulation discussed herein. Each of these components may be in communication with one another (e.g., via one or more buses).

Receiver 410 may receive information such as packets, user data, or control information associated with various information channels (e.g., control channels, data channels, and information related to UE capability constraint indications for high order modulation, etc.). Information may be passed on to other components of the device. The receiver 410 may be an example of aspects of the transceiver 735 described with reference to FIG. 7. The receiver 410 may utilize a single antenna or a set of antennas.

Receiver 410 may receive a downlink transmission that is modulated at the first modulation order.

UE communications manager 415 may be an example of aspects of the UE communications manager 715 described with reference to FIG. 7.

UE communications manager 415 and/or at least some of its various sub-components may be implemented in hardware, software executed by a processor, firmware, or any combination thereof. If implemented in software executed by a processor, the functions of the UE communications manager 415 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 415 and/or at least some of its various sub-components may be physically located at various positions, including being distributed such that portions of functions are implemented at different physical locations by one or more physical devices. In some examples, UE communications manager 415 and/or at least some of its various sub-components may be a separate and distinct component in accordance with various aspects of the present disclosure. In other examples, UE communications manager 415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 415 may identify a capability of a UE to support communications that are modulated at a first modulation order, determine one or more constraints of the UE for communications that are modulated at the first modulation order, and set a UE radio access capability parameter that indicates the first modulation order is supported by the UE and that indicates the one or more constraints of the UE for communications modulated at the first modulation order.

Transmitter 420 may transmit signals generated by other components of the device. In some examples, the transmitter 420 may be collocated with a receiver 410 in a transceiver module. For example, the transmitter 420 may be an example of aspects of the transceiver 735 described with reference to FIG. 7. The transmitter 420 may utilize a single antenna or a set of antennas.

Transmitter 420 may transmit the UE radio access capability parameter to a base station and transmit the uplink transmission to the base station.

Figure 5:
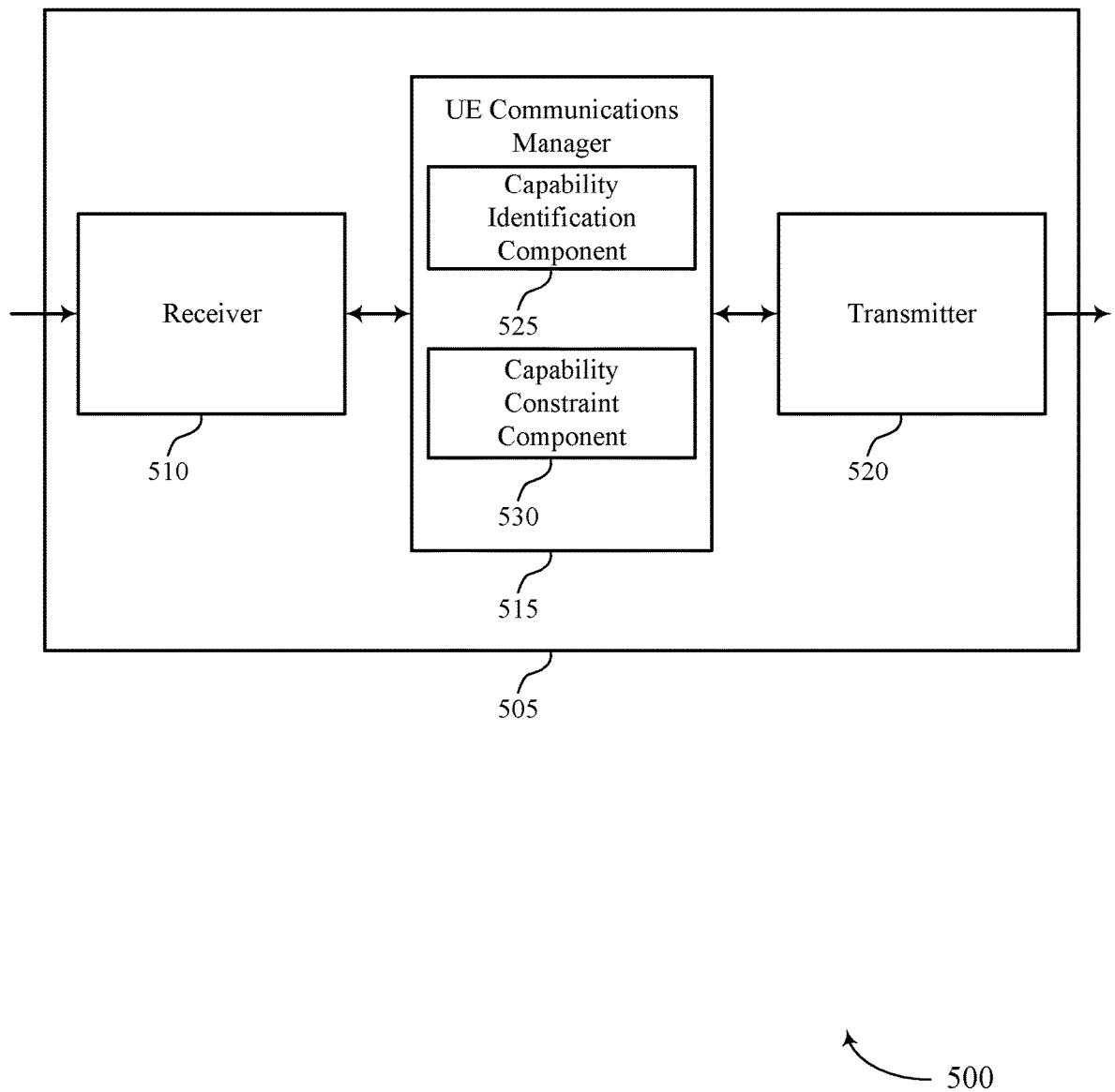

FIG. 5 shows a block diagram 500 of a wireless device 505 that supports UE capability constraint indications for high order modulation in accordance with aspects of the present disclosure. Wireless device 505 may be an example of aspects of a wireless device 405 or a UE 115 as described with reference to FIG. 4. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to UE capability constraint indications for high order modulation, etc.). Information may be passed on to other components of the device. The receiver 510 may be an example of aspects of the transceiver 735 described with reference to FIG. 7. The receiver 510 may utilize a single antenna or a set of antennas.

UE communications manager 515 may be an example of aspects of the UE communications manager 715 described with reference to FIG. 7. UE communications manager 515 may also include capability identification component 525 and capability constraint component 530.

Capability identification component 525 may identify a capability of a UE to support communications that are modulated at a first modulation order and set a UE radio access capability parameter that indicates the first modulation order is supported by the UE and that indicates the one or more constraints of the UE for communications modulated at the first modulation order. Capability identification component 525 may be a processor (e.g., a transceiver processor, or a radio processor, or a receiver processor). The processor may be coupled with memory and execute instructions stored in the memory that enable the processor to perform or facilitate the features discussed herein.

Capability constraint component 530 may identify one or more constraints of the UE for communications that are modulated at the first modulation order. In some cases, the one or more constraints indicate that a transport block size associated with a second modulation order is to be used for communications with the UE that are modulated at the first modulation order. In some cases, the constraint may apply to all frequency bands and combinations of frequency bands supported by the UE. In some cases, the one or more constraints indicate that for a first frequency band, a TBS of a second modulation order is to be used for communications with the UE that are modulated at the first modulation order; and for a second frequency band, a TBS of the first modulation order is to be used for communications with the UE that are modulated at the first modulation order. In some cases, the first frequency band is a millimeter wave frequency band, and the second frequency band is a lower frequency band than the first frequency band. Capability constraint component 530 may be a processor (e.g., a transceiver processor, or a radio processor, or a receiver processor). The processor may be coupled with memory and execute instructions stored in the memory that enable the processor to perform or facilitate the features discussed herein.

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may utilize a single antenna or a set of antennas.

Figure 6:
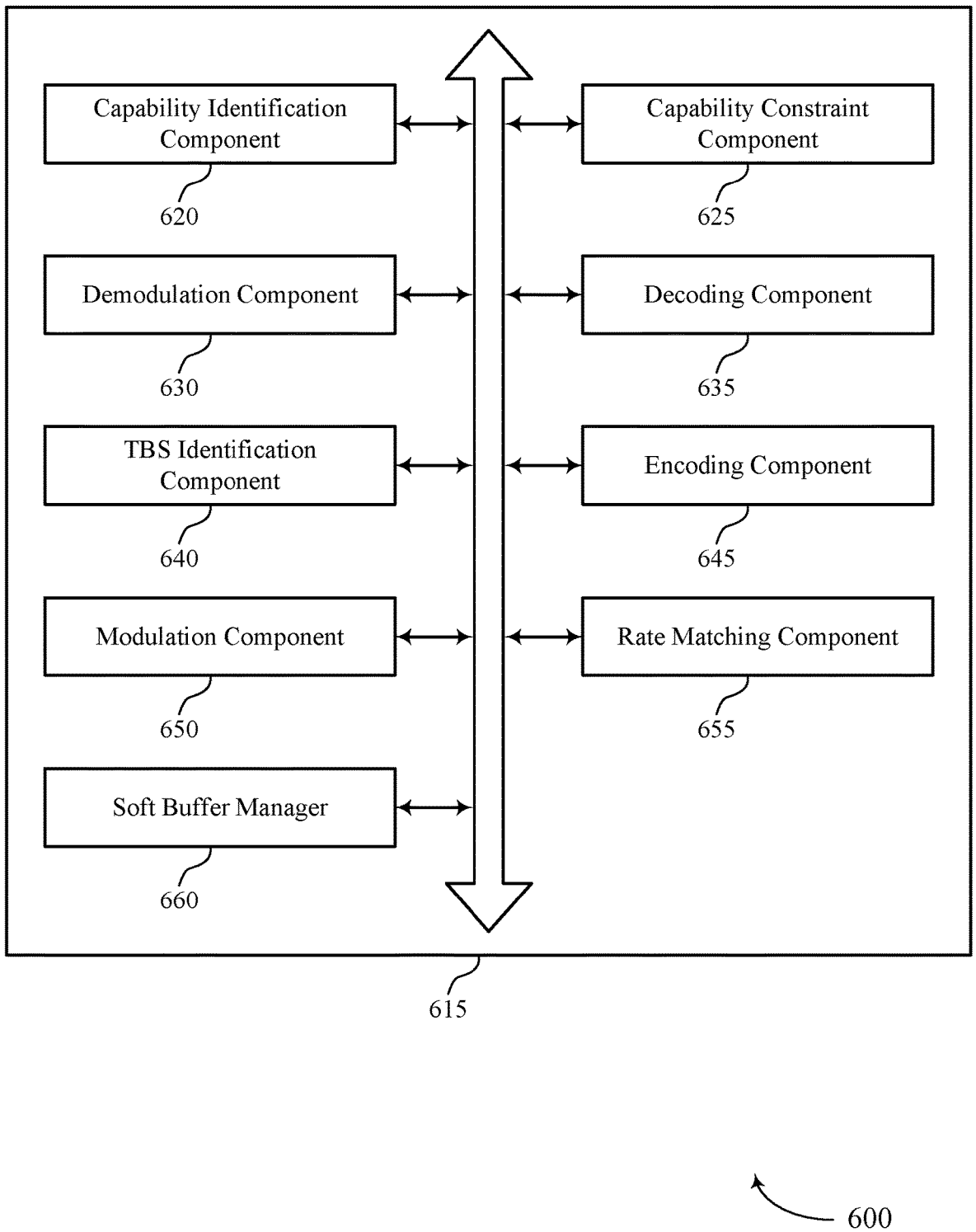

FIG. 6 shows a block diagram 600 of a UE communications manager 615 that supports UE capability constraint indications for high order modulation in accordance with aspects of the present disclosure. The UE communications manager 615 may be an example of aspects of a UE communications manager 415, a UE communications manager 515, or a UE communications manager 715 described with reference to FIGS. 4, 5, and 7. The UE communications manager 615 may include capability identification component 620, capability constraint component 625, demodulation component 630, decoding component 635, TBS identification component 640, encoding component 645, modulation component 650, rate matching component 655, and soft buffer manager 660. The UE communications manager 615 may include one or more processors, memory coupled with the one or more processors, and instructions stored in the memory that are executable by the one or more processors to enable the one or more processors to perform the features discussed herein. Each of these components may be in communication with each other. Each of these modules may communicate, directly or indirectly, with one another (e.g., via one or more buses).

Capability identification component 620 may identify a capability of a UE to support communications that are modulated at a first modulation order and set a UE radio access capability parameter that indicates the first modulation order is supported by the UE and that indicates the one or more constraints of the UE for communications modulated at the first modulation order. The processor may implement some or all of the operations of the capability identification component 620. Capability identification component 620 may be a processor (e.g., a transceiver processor, or a radio processor, or a receiver processor). The processor may be coupled with memory and execute instructions stored in the memory that enable the processor to perform or facilitate the capability identification features discussed herein.

Capability constraint component 625 may identify one or more constraints of the UE for communications that are modulated at the first modulation order. In some cases, the one or more constraints indicate that a transport block size associated with a second modulation order is to be used for communications with the UE that are modulated at the first modulation order. In some cases, the constraint may apply to all frequency bands and combinations of frequency bands supported by the UE. In some cases, the one or more constraints indicate that for a first frequency band, a TBS of a second modulation order is to be used for communications with the UE that are modulated at the first modulation order; and for a second frequency band, a TBS of the first modulation order is to be used for communications with the UE that are modulated at the first modulation order. In some cases, the first frequency band is a millimeter wave frequency band, and the second frequency band is a lower frequency band than the first frequency band. Capability constraint component 625 may be a processor (e.g., a transceiver processor, or a radio processor, or a receiver processor). The processor may be coupled with memory and execute instructions stored in the memory that enable the processor to perform or facilitate the capability constraint features discussed herein.

Demodulation component 630 may demodulate the downlink transmission according to the first modulation order. In some cases, the first modulation order is 256QAM and the second modulation order is 64QAM. Demodulation component 630 may be a processor (e.g., a transceiver processor, or a radio processor, or a receiver processor). The processor may be coupled with memory and execute instructions stored in the memory that enable the processor to perform or facilitate the demodulation features discussed herein. Decoding component 635 may decode the demodulated downlink transmission based on the one or more constraints of the UE. In some cases, decoding component 635 may decode the demodulated downlink transmission based on a TBS associated with the second modulation order. The processor may implement some or all of the operations of the decoding component 635. Decoding component 635 may be a processor (e.g., a transceiver processor, or a radio processor, or a receiver processor). The processor may be coupled with memory and execute instructions stored in the memory that enable the processor to perform or facilitate the decoding features discussed herein.

TBS identification component 640 may identify a TBS associated with a second modulation order based on the one or more constraints of the UE, the second modulation order being a lower modulation order than the first modulation order, and use the identified TBS for encoding or decoding transmissions transmitted at the first modulation order. TBS identification component 640 may be a processor (e.g., a transceiver processor, or a radio processor, or a receiver processor). The processor may be coupled with memory and execute instructions stored in the memory that enable the processor to perform or facilitate the features TBS identification features discussed herein.

Encoding component 645 may encode an uplink transmission using a data rate that is based on the one or more constraints of the UE for communications at the first modulation order. In some cases, TBS used for encoding may be associated with a second modulation order, based on the one or more constraints of the UE, the second modulation order being a lower modulation order than the first modulation order. Encoding component 645 may be a processor (e.g., a transceiver processor, or a radio processor, or a receiver processor). The processor may be coupled with memory and execute instructions stored in the memory that enable the processor to perform or facilitate the encoding features discussed herein.

Modulation component 650 may modulate the uplink transmission according to the first modulation order. In some cases, the first modulation order is 256QAM and the second modulation order is 64QAM. Modulation component 650 may be a processor (e.g., a transceiver processor, or a radio processor, or a receiver processor). The processor may be coupled with memory and execute instructions stored in the memory that enable the processor to perform or facilitate the modulation features discussed herein.

Rate matching component 655 may perform rate matching of a number of bits modulated using the first modulation order within a TB to a number of bits that can be sent in a resource allocation. Such rate matching may be based on a first rate matching associated with the first modulation order. In some cases, the rate matching may be based on a second rate matching associated with a lower modulation order than the first modulation order. Rate matching component 655 may be a processor (e.g., a transceiver processor, or a radio processor, or a receiver processor). The processor may be coupled with memory and execute instructions stored in the memory that enable the processor to perform or facilitate the rate matching features discussed herein.

Soft buffer manager 660 may set a soft buffer size based on the first modulation order or set a soft buffer size based on a lower modulation order than the first modulation order, based on the one or more constraints of the UE. Soft buffer manager 660 may be a processor (e.g., a transceiver processor, or a radio processor, or a receiver processor). The processor may be coupled with memory and execute instructions stored in the memory that enable the processor to perform or facilitate the soft buffer features discussed herein.

Figure 7:
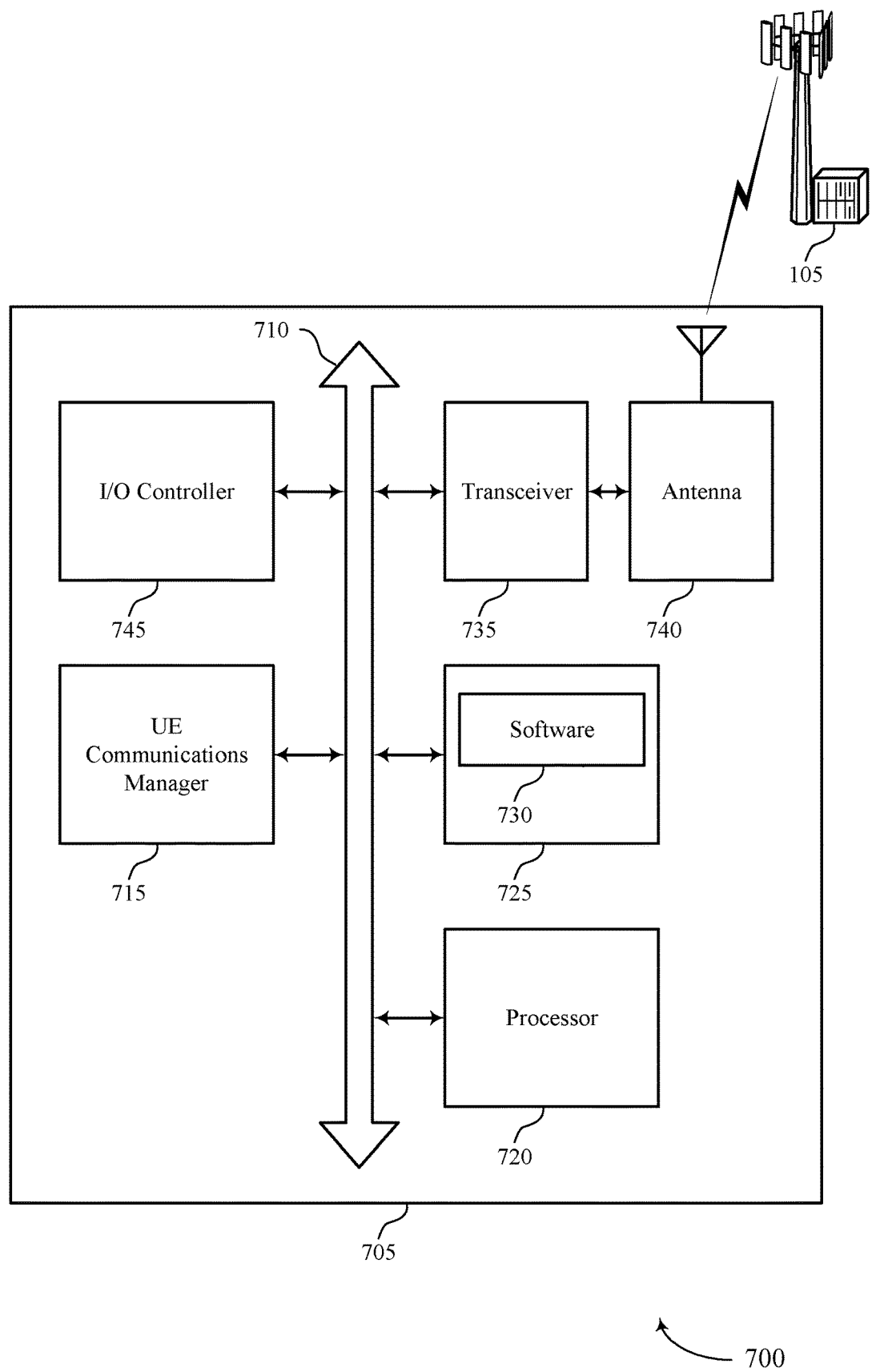
FIG. 7 illustrates a block diagram of a system including a UE that supports UE capability constraint indications for high order modulation in accordance with aspects of the present disclosure.

FIG. 7 shows a diagram of a system 700 including a device 705 that supports UE capability constraint indications for high order modulation in accordance with aspects of the present disclosure. Device 705 may be an example of or include the components of wireless device 405, wireless device 505, or a UE 115 as described herein, e.g., with reference to FIGS. 4 and 5. Device 705 may include components for bi-directional voice and data communications including components for transmitting and receiving communications, including UE communications manager 715, processor 720, memory 725, software 730, transceiver 735, antenna 740, and I/O controller 745. These components may be in electronic communication via one or more buses (e.g., bus 710). Device 705 may communicate wirelessly with one or more base stations 105.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting UE capability constraint indications for high order modulation).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware or software operation such as the interaction with peripheral components or devices.

Software 730 may include code to implement aspects of the present disclosure, including code to support UE capability constraint indications for high order modulation. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described herein. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas.

In some cases, the wireless device may include a single antenna 740. However, in some cases the device may have more than one antenna 740, which may be capable of concurrently transmitting or receiving multiple wireless transmissions.

I/O controller 745 may manage input and output signals for device 705. I/O controller 745 may also manage peripherals not integrated into device 705. In some cases, I/O controller 745 may represent a physical connection or port to an external peripheral. In some cases, I/O controller 745 may utilize an operating system such as iOS®, ANDROID®, MS-DOS®, MS-WINDOWS®, OS/2®, UNIX®, LINUX®, or another known operating system. In other cases, I/O controller 745 may represent or interact with a modem, a keyboard, a mouse, a touchscreen, or a similar device. In some cases, I/O controller 745 may be implemented as part of a processor. In some cases, a user may interact with device 705 via I/O controller 745 or via hardware components controlled by I/O controller 745.

Figure 8:
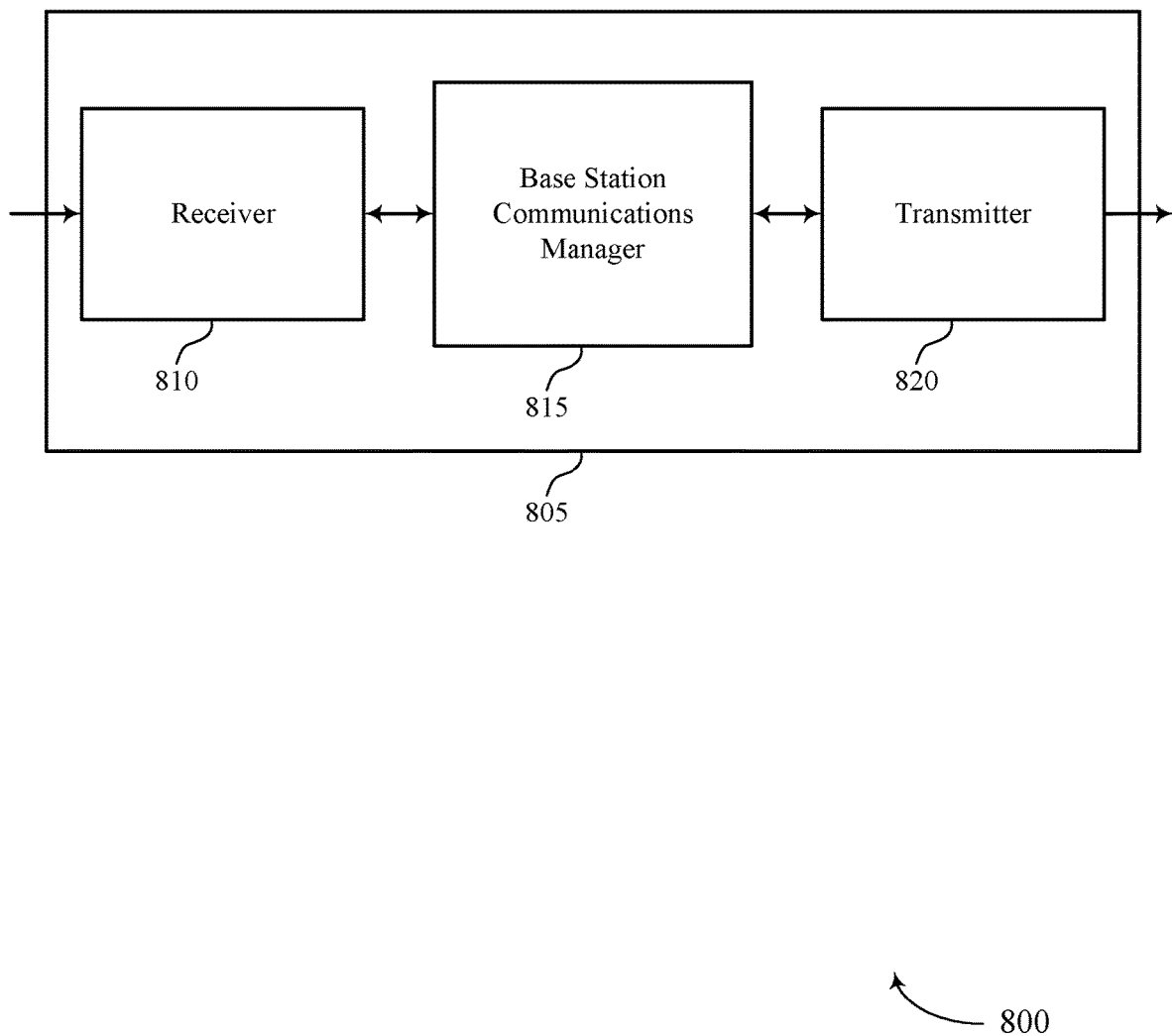
FIGS. 8 through 10 show block diagrams of a device that supports UE capability constraint indications for high order modulation in accordance with aspects of the present disclosure.

FIG. 8 shows a block diagram 800 of a wireless device 805 that supports UE capability constraint indications for high order modulation in accordance with aspects of the present disclosure. Wireless device 805 may be an example of aspects of a base station 105 as described herein. Wireless device 805 may include receiver 810, base station communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to UE capability constraint indications for high order modulation, etc.). Information may be passed on to other components of the device. The receiver 810 may be an example of aspects of the transceiver 1135 described with reference to FIG. 11. The receiver 810 may utilize a single antenna or a set of antennas.

Receiver 810 may receive an uplink transmission that is modulated at the first modulation order.

Base station communications manager 815 may be an example of aspects of the base station communications manager 1115 described with reference to FIG. 11.

Base station communications manager 815 and/or at least some of its various sub-components may be implemented in hardware, software executed by a processor, firmware, or any combination thereof. If implemented in software executed by a processor, the functions of the base station communications manager 815 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 815 and/or at least some of its various sub-components may be physically located at various positions, including being distributed such that portions of functions are implemented at different physical locations by one or more physical devices. In some examples, base station communications manager 815 and/or at least some of its various sub-components may be a separate and distinct component in accordance with various aspects of the present disclosure. In other examples, base station communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 815 may receive, from a UE, a UE radio access capability parameter that indicates a capability of the UE to support communications that are modulated at a first modulation order and one or more constraints of the UE for communications that are modulated at the first modulation order, encode a downlink transmission using a data rate that is based on the one or more constraints of the UE for communications at the first modulation order, and modulate the downlink transmission according to the first modulation order.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas. Transmitter 820 may transmit the downlink transmission to the UE.

Figure 9:
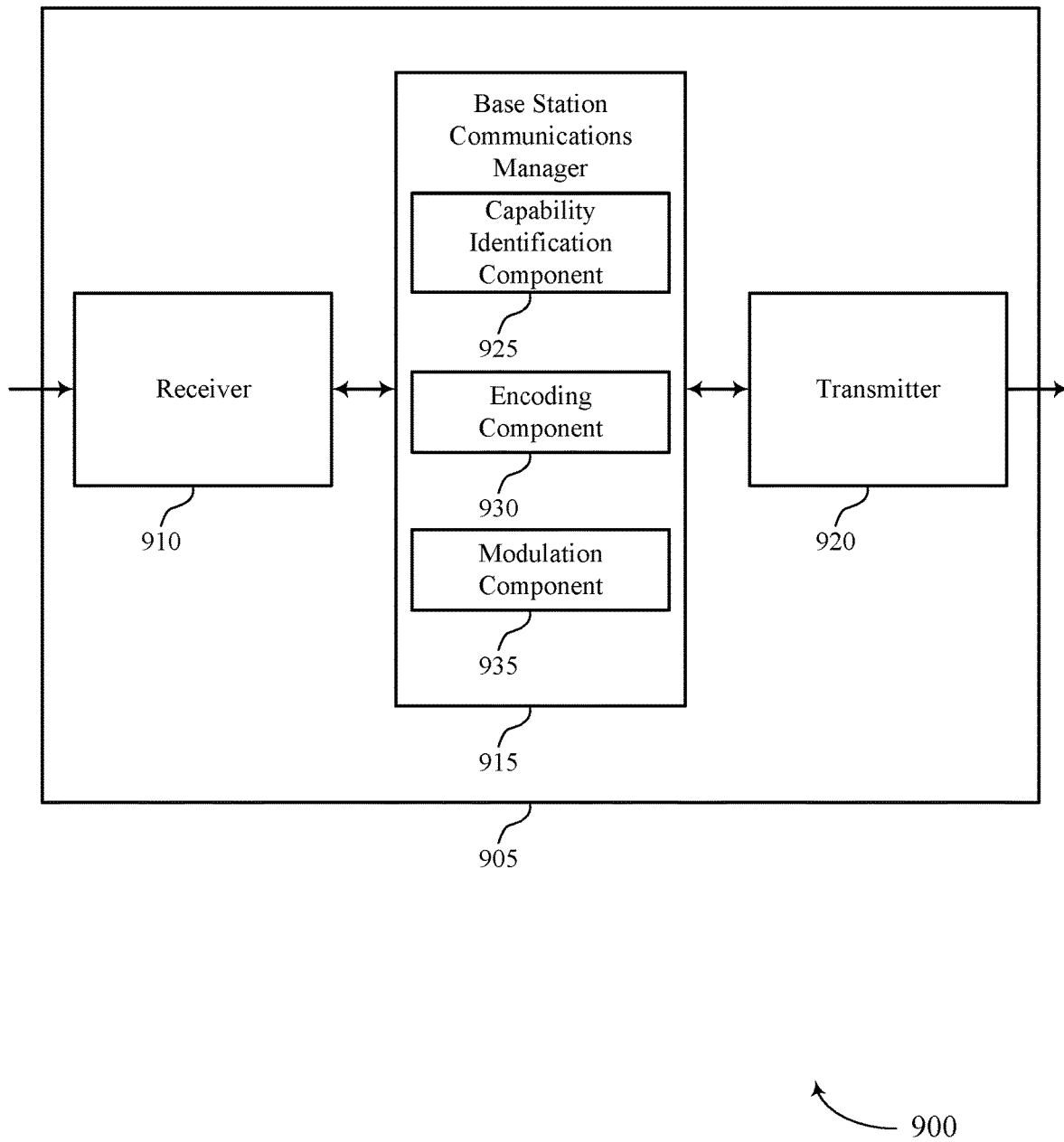

FIG. 9 shows a block diagram 900 of a wireless device 905 that supports UE capability constraint indications for high order modulation in accordance with aspects of the present disclosure. Wireless device 905 may be an example of aspects of a wireless device 805 or a base station 105 as described with reference to FIG. 8. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to UE capability constraint indications for high order modulation, etc.). Information may be passed on to other components of the device. The receiver 910 may be an example of aspects of the transceiver 1135 described with reference to FIG. 11. The receiver 910 may utilize a single antenna or a set of antennas.

Base station communications manager 915 may be an example of aspects of the base station communications manager 1115 described with reference to FIG. 11. Base station communications manager 915 may also include capability identification component 925, encoding component 930, and modulation component 935. Base station communications manager 915 may be a processor (e.g., a transceiver processor, or a radio processor, or a receiver processor). The processor may be coupled with memory and execute instructions stored in the memory that enable the processor to perform or facilitate the base station features discussed herein.

Capability identification component 925 may receive, from a UE, a UE radio access capability parameter that indicates a capability of the UE to support communications that are modulated at a first modulation order and one or more constraints of the UE for communications that are modulated at the first modulation order. Capability identification component 925 may be a processor (e.g., a transceiver processor, or a radio processor, or a receiver processor). The processor may be coupled with memory and execute instructions stored in the memory that enable the processor to perform or facilitate the capability identification features discussed herein.

Encoding component 930 may encode a downlink transmission using a data rate that is based on the one or more constraints of the UE for communications at the first modulation order. In some cases, the downlink transmission may be encoded based on a first TBS associated with a second modulation order. Encoding component 930 may be a processor (e.g., a transceiver processor, or a radio processor, or a receiver processor). The processor may be coupled with memory and execute instructions stored in the memory that enable the processor to perform or facilitate the encoding features discussed herein.

Modulation component 935 may modulate the downlink transmission according to the first modulation order. In some cases, the first modulation order is 256QAM and the second modulation order is 64QAM. Modulation component 935 may be a processor (e.g., a transceiver processor, or a radio processor, or a receiver processor). The processor may be coupled with memory and execute instructions stored in the memory that enable the processor to perform or facilitate the modulation features discussed herein.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
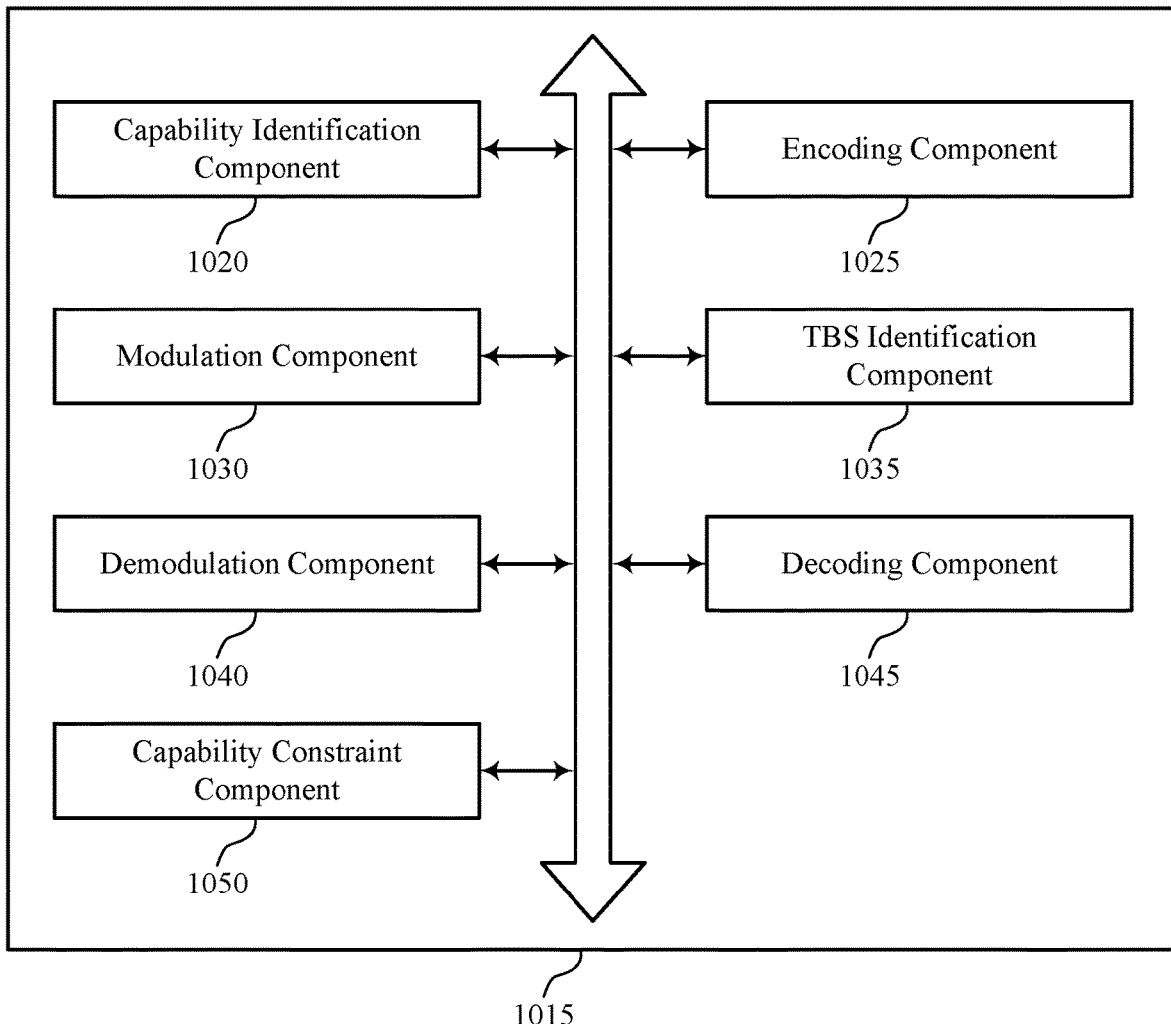

FIG. 10 shows a block diagram 1000 of a base station communications manager 1015 that supports UE capability constraint indications for high order modulation in accordance with aspects of the present disclosure. The base station communications manager 1015 may be an example of aspects of a base station communications manager 1115 described with reference to FIGS. 8, 9, and 11. The base station communications manager 1015 may include capability identification component 1020, encoding component 1025, modulation component 1030, TBS identification component 1035, demodulation component 1040, decoding component 1045, and capability constraint component 1050. Each of these modules may communicate, directly or indirectly, with one another (e.g., via one or more buses).

Capability identification component 1020 may receive, from a UE, a UE radio access capability parameter that indicates a capability of the UE to support communications that are modulated at a first modulation order and one or more constraints of the UE for communications that are modulated at the first modulation order. Capability identification component 1020 may be a processor (e.g., a transceiver processor, or a radio processor, or a receiver processor). The processor may be coupled with memory and execute instructions stored in the memory that enable the processor to perform or facilitate the capability identification features discussed herein.

Encoding component 1025 may encode a downlink transmission using a data rate that is based on the one or more constraints of the UE for communications at the first modulation order. In some cases, the downlink transmission may be encoded based on a first TBS associated with a second modulation order. Encoding component 1025 may be a processor (e.g., a transceiver processor, or a radio processor, or a receiver processor). The processor may be coupled with memory and execute instructions stored in the memory that enable the processor to perform or facilitate the encoding features discussed herein.

Modulation component 1030 may modulate the downlink transmission according to the first modulation order. In some cases, the first modulation order is 256QAM and the second modulation order is 64QAM. Modulation component 1030 may be a processor (e.g., a transceiver processor, or a radio processor, or a receiver processor). The processor may be coupled with memory and execute instructions stored in the memory that enable the processor to perform or facilitate the modulation features discussed herein.

TBS identification component 1035 may identify a first TBS associated with a second modulation order based on the one or more constraints of the UE, the second modulation order being a lower modulation order than the first modulation order. In some cases, an uplink transmission may be decoded based on identifying a first TBS associated with a second modulation order based on the one or more constraints of the UE, the second modulation order being a lower modulation order than the first modulation order. TBS identification component 1035 may be a processor (e.g., a transceiver processor, or a radio processor, or a receiver processor). The processor may be coupled with memory and execute instructions stored in the memory that enable the processor to perform or facilitate the features TBS identification features discussed herein.

Demodulation component 1040 may demodulate the uplink transmission according to the first modulation order.

Demodulation component 1040 may be a processor (e.g., a transceiver processor, or a radio processor, or a receiver processor). The processor may be coupled with memory and execute instructions stored in the memory that enable the processor to perform or facilitate the demodulation features discussed herein.

Decoding component 1045 may decode the demodulated uplink transmission based on the one or more constraints of the UE and decode the demodulated uplink transmission based on the first TBS. Decoding component 1045 may be a processor (e.g., a transceiver processor, or a radio processor, or a receiver processor). The processor may be coupled with memory and execute instructions stored in the memory that enable the processor to perform or facilitate the decoding features discussed herein.

Capability constraint component 1050 may identify, such as based on a capability constraint provided with a UE capability, one or more capability constraints. In some cases, the one or more constraints indicate that a transport block size associated with a second modulation order is to be used for communications with the UE that are modulated at the first modulation order. In some cases, the one or more constraints indicate that, for a first frequency band, a TBS of a second modulation order is to be used for communications with the UE that are modulated at the first modulation order; and for a second frequency band, a TBS of the first modulation order is to be used for communications with the UE that are modulated at the first modulation order. In some cases, the first frequency band is a millimeter wave frequency band, and the second frequency band is a lower frequency band than the first frequency band. Capability constraint component 1050 may be a processor (e.g., a transceiver processor, or a radio processor, or a receiver processor). The processor may be coupled with memory and execute instructions stored in the memory that enable the processor to perform or facilitate the capability constraint features discussed herein.

Figure 11:
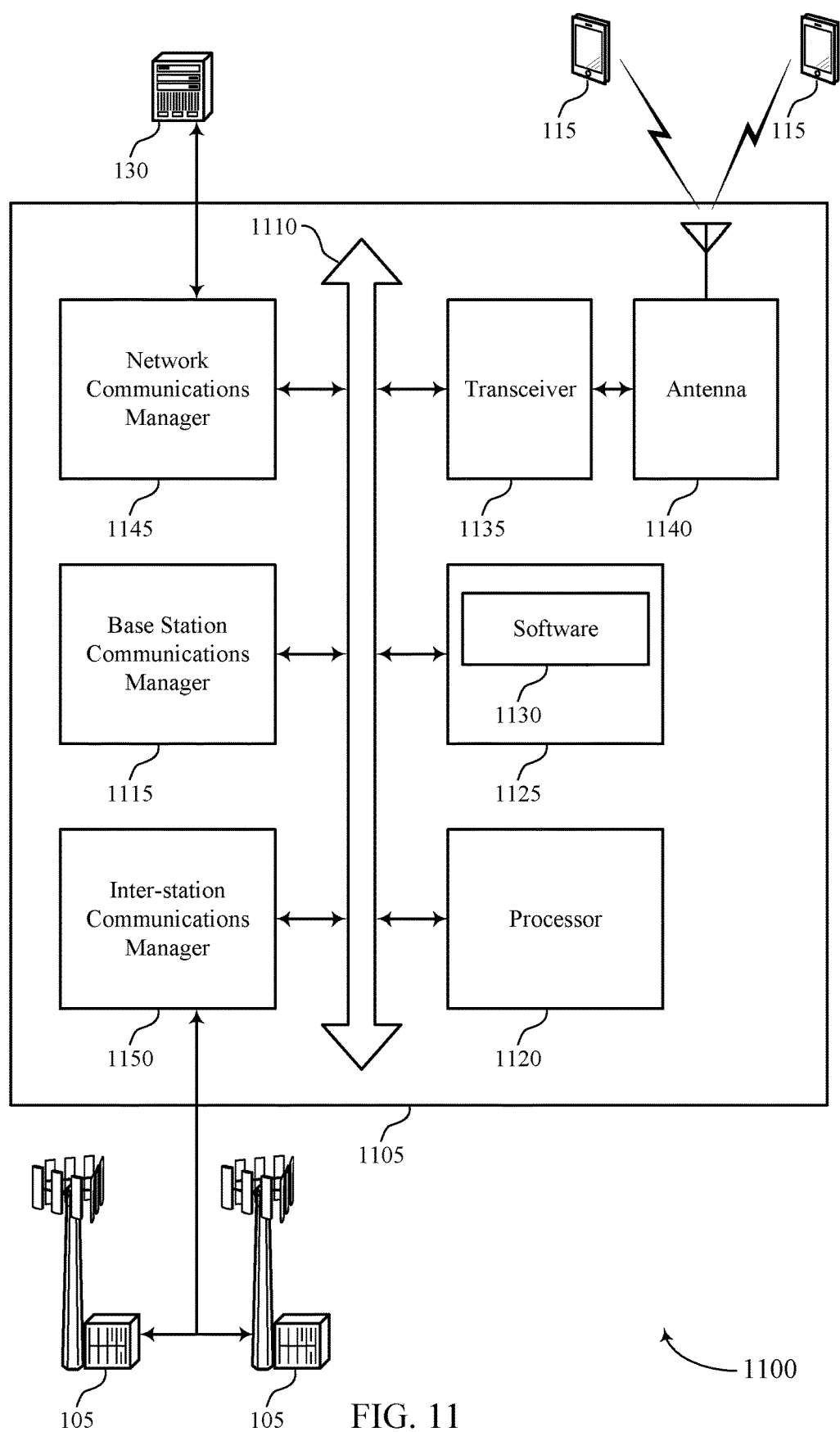
FIG. 11 illustrates a block diagram of a system including a base station that supports UE capability constraint indications for high order modulation in accordance with aspects of the present disclosure.

FIG. 11 shows a diagram of a system 1100 including a device 1105 that supports UE capability constraint indications for high order modulation in accordance with aspects of the present disclosure. Device 1105 may be an example of or include the components of base station 105 as described herein, e.g., with reference to FIG. 1. Device 1105 may include components for bi-directional voice and data communications including components for transmitting and receiving communications, including base station communications manager 1115, processor 1120, memory 1125, software 1130, transceiver 1135, antenna 1140, network communications manager 1145, and inter-station communications manager 1150. These components may be in electronic communication via one or more buses (e.g., bus 1110). Device 1105 may communicate wirelessly with one or more UEs 115.

Processor 1120 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting UE capability constraint indications for high order modulation).

Memory 1125 may include RAM and ROM. The memory 1125 may store computer-readable, computer-executable software 1130 including instructions that, when executed, cause the processor to perform various functions described herein. In some cases, the memory 1125 may contain, among other things, a BIOS which may control basic hardware or software operation such as the interaction with peripheral components or devices.

Software 1130 may include code to implement aspects of the present disclosure, including code to support UE capability constraint indications for high order modulation. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described herein. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

Network communications manager 1145 may manage communications with the core network (e.g., via one or more wired backhaul links). For example, the network communications manager 1145 may manage the transfer of data communications for client devices, such as one or more UEs 115.

Inter-station communications manager 1150 may manage communications with other base station 105, and may include a controller or scheduler for controlling communications with UEs 115 in cooperation with other base stations 105. For example, the inter-station communications manager 1150 may coordinate scheduling for transmissions to UEs 115 for various interference mitigation techniques such as beamforming or joint transmission. In some examples, inter-station communications manager 1150 may provide an X2 interface within an Long Term Evolution (LTE)/LTE-A wireless communication network technology to provide communication between base stations 105.

Figure 12:
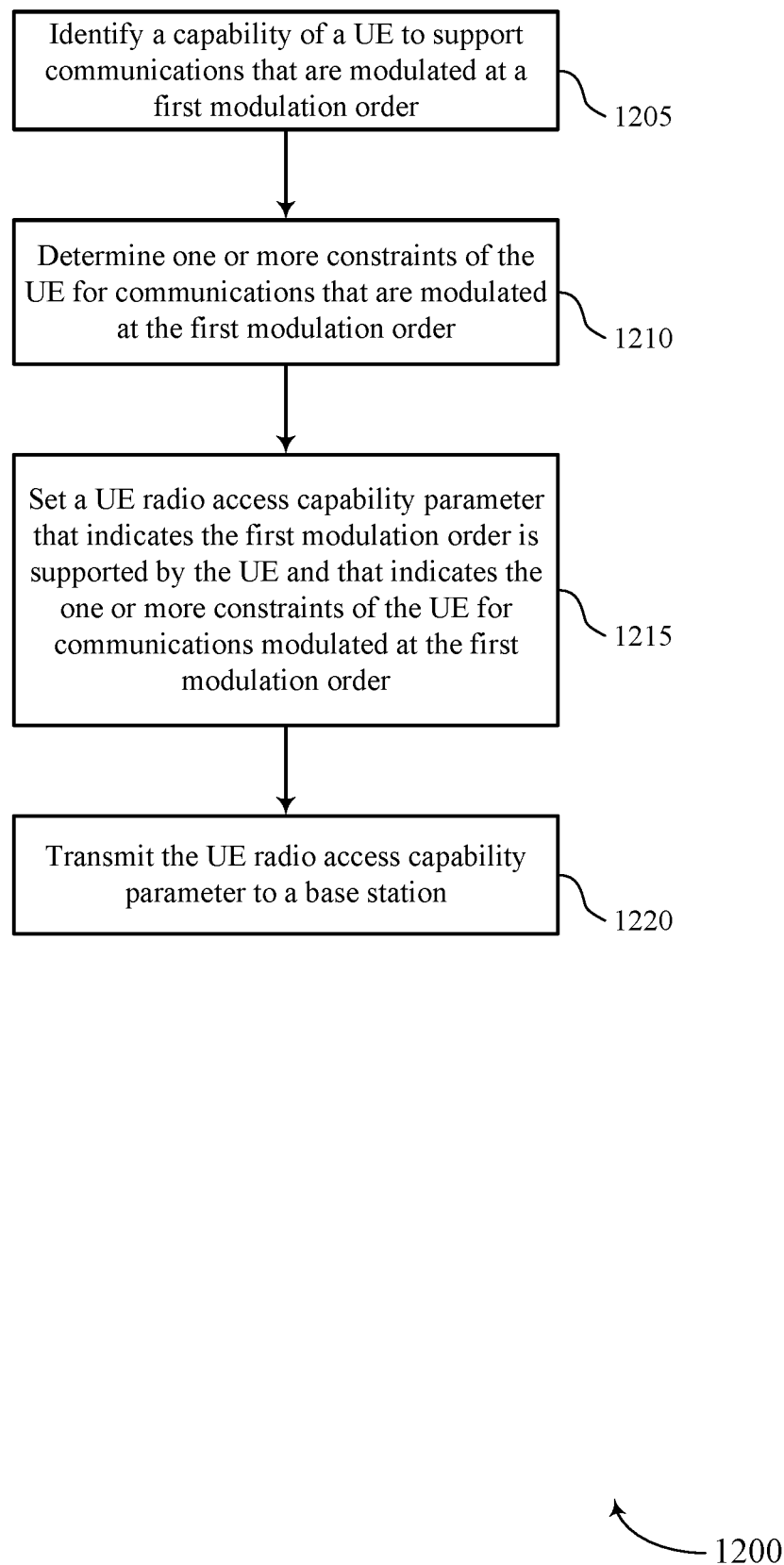
FIGS. 12 through 17 illustrate methods for UE capability constraint indications for high order modulation in accordance with aspects of the present disclosure.

FIG. 12 shows a flowchart illustrating a method 1200 for UE capability constraint indications for high order modulation in accordance with aspects of the present disclosure. The method 1200 may method of wireless communication. The operations of method 1200 may be implemented by a UE 115 or its components as described herein. For example, the operations of method 1200 may be performed by a UE communications manager as described with reference to FIGS. 4 through 7. In some examples, a UE 115 may execute a set of codes to control the functional elements of the device to perform the functions described herein. Additionally or alternatively, the UE 115 may perform aspects of the functions described herein using special-purpose hardware.

At block 1205 the UE 115 may identify a capability of a UE to support communications that are modulated at a first modulation order. The operations of block 1205 may be performed according to the methods described herein. In certain examples, aspects of the operations of block 1205 may be performed by a capability identification component as described with reference to FIGS. 4 through 7.

At block 1210 the UE 115 may determine one or more constraints of the UE for communications that are modulated at the first modulation order. The operations of block 1210 may be performed according to the methods described herein. In certain examples, aspects of the operations of block 1210 may be performed by a capability constraint component as described with reference to FIGS. 4 through 7.

At block 1215 the UE 115 may set a UE radio access capability parameter that indicates the first modulation order is supported by the UE and that indicates the one or more constraints of the UE for communications modulated at the first modulation order. The operations of block 1215 may be performed according to the methods described herein. In certain examples, aspects of the operations of block 1215 may be performed by a capability identification component as described with reference to FIGS. 4 through 7.

At block 1220 the UE 115 may transmit the UE radio access capability parameter to a base station. The operations of block 1220 may be performed according to the methods described herein. In certain examples, aspects of the operations of block 1220 may be performed by a transmitter as described with reference to FIGS. 4 through 7.

Figure 13:
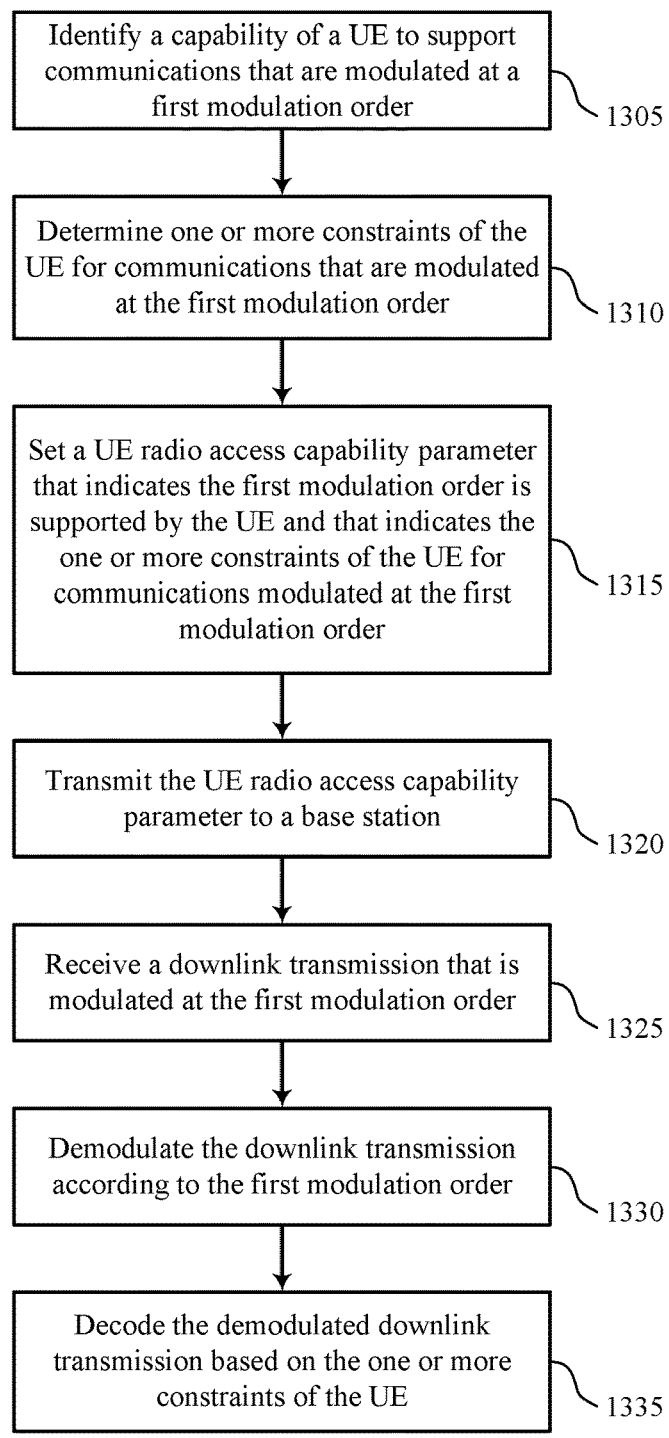

FIG. 13 shows a flowchart illustrating a method 1300 for UE capability constraint indications for high order modulation in accordance with aspects of the present disclosure. The method 1300 may method of wireless communication. The operations of method 1300 may be implemented by a UE 115 or its components as described herein. For example, the operations of method 1300 may be performed by a UE communications manager as described with reference to FIGS. 4 through 7. In some examples, a UE 115 may execute a set of codes to control the functional elements of the device to perform the functions described herein. Additionally or alternatively, the UE 115 may perform aspects of the functions described herein using special-purpose hardware.

At block 1305 the UE 115 may identify a capability of a UE to support communications that are modulated at a first modulation order. The operations of block 1305 may be performed according to the methods described herein. In certain examples, aspects of the operations of block 1305 may be performed by a capability identification component as described with reference to FIGS. 4 through 7.

At block 1310 the UE 115 may determine one or more constraints of the UE for communications that are modulated at the first modulation order. The operations of block 1310 may be performed according to the methods described herein. In certain examples, aspects of the operations of block 1310 may be performed by a capability constraint component as described with reference to FIGS. 4 through 7.

At block 1315 the UE 115 may set a UE radio access capability parameter that indicates the first modulation order is supported by the UE and that indicates the one or more constraints of the UE for communications modulated at the first modulation order. The operations of block 1315 may be performed according to the methods described herein. In certain examples, aspects of the operations of block 1315 may be performed by a capability identification component as described with reference to FIGS. 4 through 7.

At block 1320 the UE 115 may transmit the UE radio access capability parameter to a base station. The operations of block 1320 may be performed according to the methods described herein. In certain examples, aspects of the operations of block 1320 may be performed by a transmitter as described with reference to FIGS. 4 through 7.

At block 1325 the UE 115 may receive a downlink transmission that is modulated at the first modulation order. The operations of block 1325 may be performed according to the methods described herein. In certain examples, aspects of the operations of block 1325 may be performed by a receiver as described with reference to FIGS. 4 through 7.

At block 1330 the UE 115 may demodulate the downlink transmission according to the first modulation order. The operations of block 1330 may be performed according to the methods described herein. In certain examples, aspects of the operations of block 1330 may be performed by a demodulation component as described with reference to FIGS. 4 through 7.

At block 1335 the UE 115 may decode the demodulated downlink transmission based at least in part on the one or more constraints of the UE. The operations of block 1335 may be performed according to the methods described herein. In certain examples, aspects of the operations of block 1335 may be performed by a decoding component as described with reference to FIGS. 4 through 7.

Figure 14:
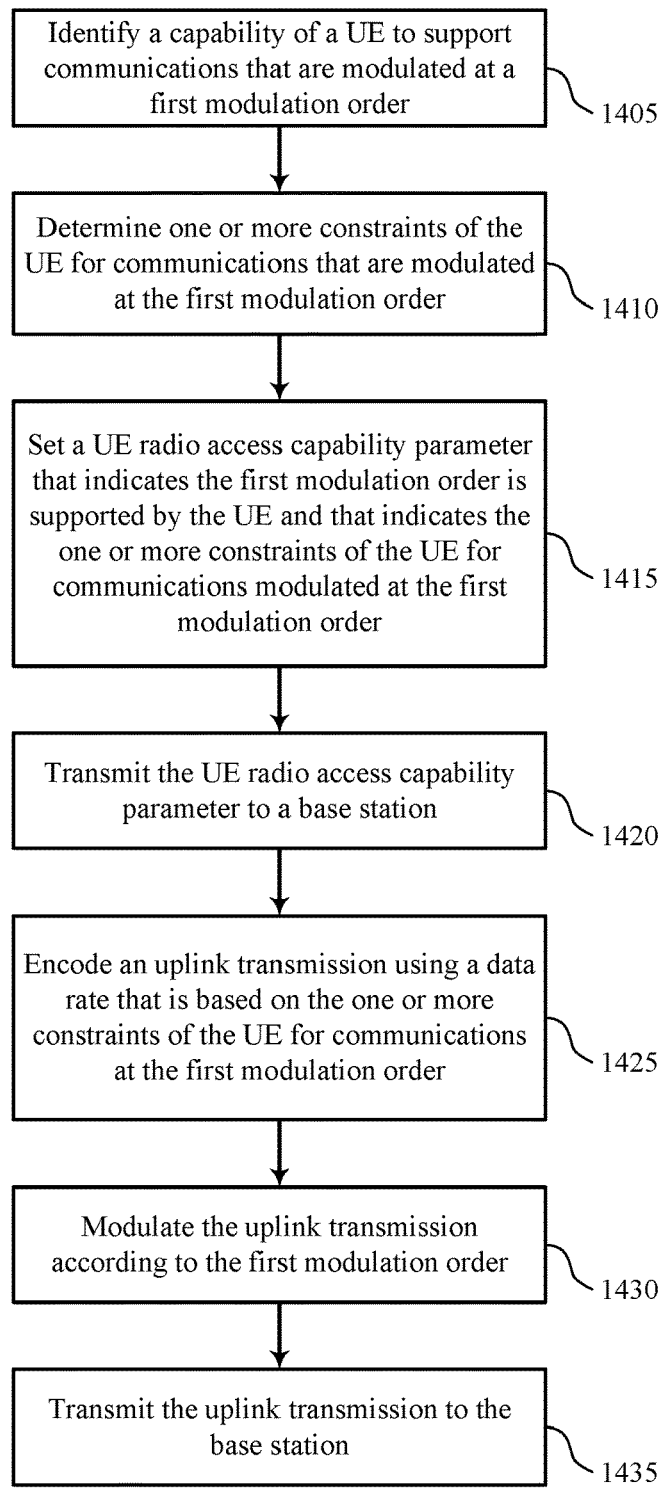

FIG. 14 shows a flowchart illustrating a method 1400 for UE capability constraint indications for high order modulation in accordance with aspects of the present disclosure. The method 1400 may method of wireless communication. The operations of method 1400 may be implemented by a UE 115 or its components as described herein. For example, the operations of method 1400 may be performed by a UE communications manager as described with reference to FIGS. 4 through 7. In some examples, a UE 115 may execute a set of codes to control the functional elements of the device to perform the functions described herein. Additionally or alternatively, the UE 115 may perform aspects of the functions described herein using special-purpose hardware.

At block 1405 the UE 115 may identify a capability of a UE to support communications that are modulated at a first modulation order. The operations of block 1405 may be performed according to the methods described herein. In certain examples, aspects of the operations of block 1405 may be performed by a capability identification component as described with reference to FIGS. 4 through 7.

At block 1410 the UE 115 may determine one or more constraints of the UE for communications that are modulated at the first modulation order. The operations of block 1410 may be performed according to the methods described herein. In certain examples, aspects of the operations of block 1410 may be performed by a capability constraint component as described with reference to FIGS. 4 through 7.

At block 1415 the UE 115 may set a UE radio access capability parameter that indicates the first modulation order is supported by the UE and that indicates the one or more constraints of the UE for communications modulated at the first modulation order. The operations of block 1415 may be performed according to the methods described herein. In certain examples, aspects of the operations of block 1415 may be performed by a capability identification component as described with reference to FIGS. 4 through 7.

At block 1420 the UE 115 may transmit the UE radio access capability parameter to a base station. The operations of block 1420 may be performed according to the methods described herein. In certain examples, aspects of the operations of block 1420 may be performed by a transmitter as described with reference to FIGS. 4 through 7.

At block 1425 the UE 115 may encode an uplink transmission using a data rate that is based at least in part on the one or more constraints of the UE for communications at the first modulation order. The operations of block 1425 may be performed according to the methods described herein. In certain examples, aspects of the operations of block 1425 may be performed by a encoding component as described with reference to FIGS. 4 through 7.

At block 1430 the UE 115 may modulate the uplink transmission according to the first modulation order. The operations of block 1430 may be performed according to the methods described herein. In certain examples, aspects of the operations of block 1430 may be performed by a modulation component as described with reference to FIGS. 4 through 7.

At block 1435 the UE 115 may transmit the uplink transmission to the base station. The operations of block 1435 may be performed according to the methods described herein. In certain examples, aspects of the operations of block 1435 may be performed by a transmitter as described with reference to FIGS. 4 through 7.

Figure 15:
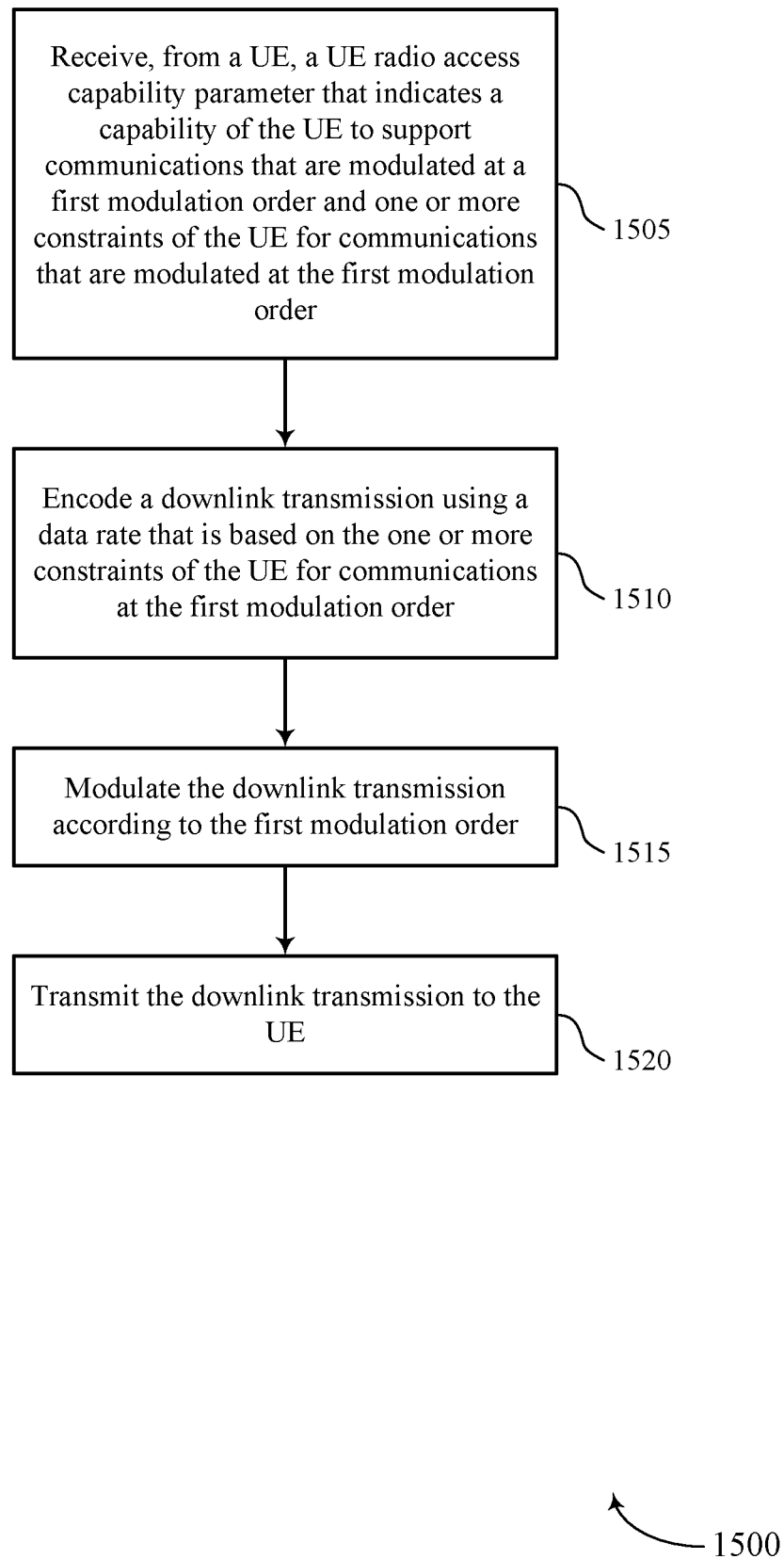

FIG. 15 shows a flowchart illustrating a method 1500 for UE capability constraint indications for high order modulation in accordance with aspects of the present disclosure. The method 1500 may method of wireless communication. The operations of method 1500 may be implemented by a base station 105 or its components as described herein. For example, the operations of method 1500 may be performed by a base station communications manager as described with reference to FIGS. 8 through 11. In some examples, a base station 105 may execute a set of codes to control the functional elements of the device to perform the functions described herein. Additionally or alternatively, the base station 105 may perform aspects of the functions described herein using special-purpose hardware.

At block 1505 the base station 105 may receive, from a UE, a UE radio access capability parameter that indicates a capability of the UE to support communications that are modulated at a first modulation order and one or more constraints of the UE for communications that are modulated at the first modulation order. The operations of block 1505 may be performed according to the methods described herein. In certain examples, aspects of the operations of block 1505 may be performed by a capability identification component as described with reference to FIGS. 8 through 11.

At block 1510 the base station 105 may encode a downlink transmission using a data rate that is based at least in part on the one or more constraints of the UE for communications at the first modulation order. The operations of block 1510 may be performed according to the methods described herein. In certain examples, aspects of the operations of block 1510 may be performed by a encoding component as described with reference to FIGS. 8 through 11.

At block 1515 the base station 105 may modulate the downlink transmission according to the first modulation order. The operations of block 1515 may be performed according to the methods described herein. In certain examples, aspects of the operations of block 1515 may be performed by a modulation component as described with reference to FIGS. 8 through 11.

At block 1520 the base station 105 may transmit the downlink transmission to the UE. The operations of block 1520 may be performed according to the methods described herein. In certain examples, aspects of the operations of block 1520 may be performed by a transmitter as described with reference to FIGS. 8 through 11.

Figure 16:
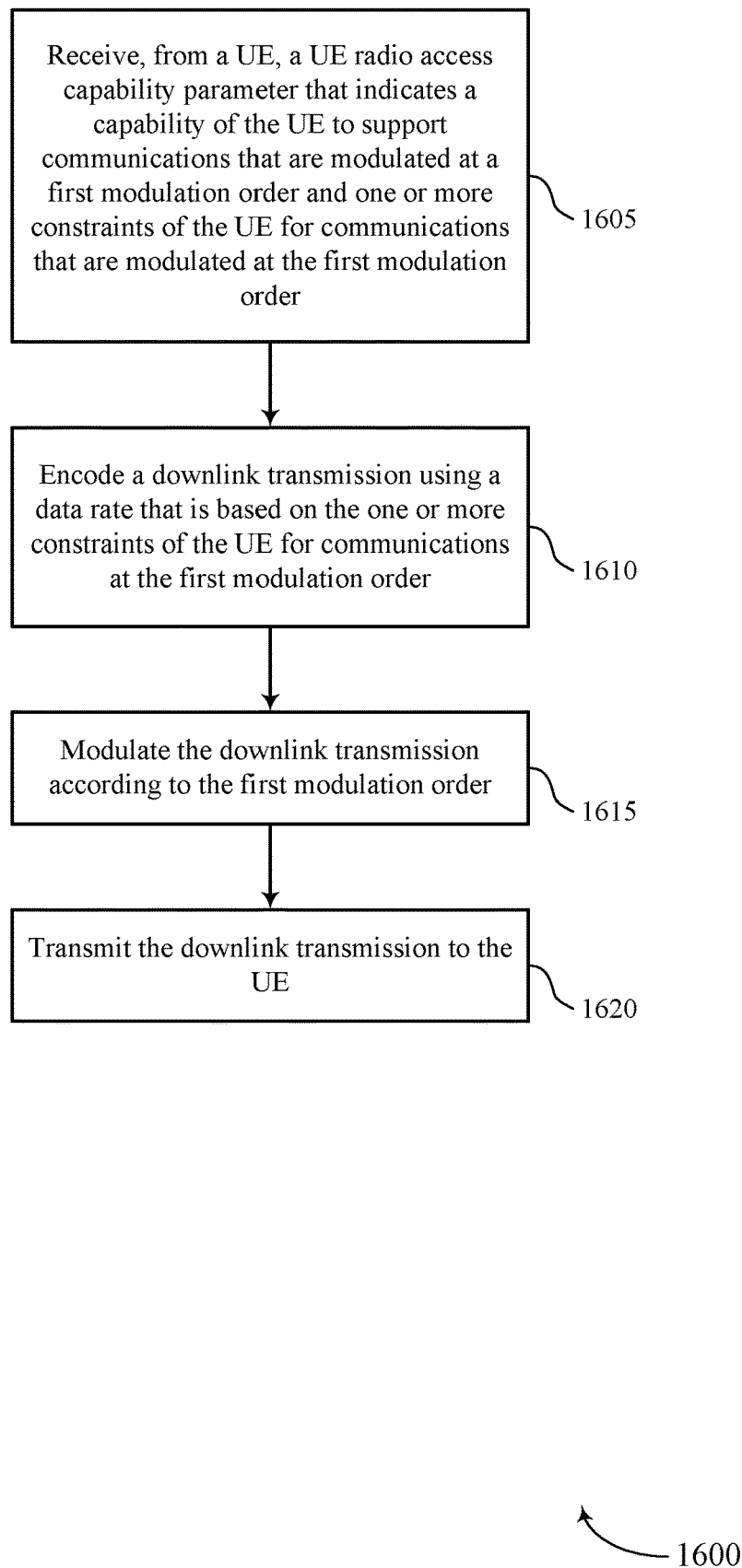

FIG. 16 shows a flowchart illustrating a method 1600 for UE capability constraint indications for high order modulation in accordance with aspects of the present disclosure. The method 1600 may method of wireless communication. The operations of method 1600 may be implemented by a base station 105 or its components as described herein. For example, the operations of method 1600 may be performed by a base station communications manager as described with reference to FIGS. 8 through 11. In some examples, a base station 105 may execute a set of codes to control the functional elements of the device to perform the functions described herein. Additionally or alternatively, the base station 105 may perform aspects of the functions described herein using special-purpose hardware.

At block 1605 the base station 105 may receive, from a UE, a UE radio access capability parameter that indicates a capability of the UE to support communications that are modulated at a first modulation order and one or more constraints of the UE for communications that are modulated at the first modulation order. The operations of block 1605 may be performed according to the methods described herein. In certain examples, aspects of the operations of block 1605 may be performed by a capability identification component as described with reference to FIGS. 8 through 11.

At block 1610 the base station 105 may encode a downlink transmission using a data rate that is based at least in part on the one or more constraints of the UE for communications at the first modulation order. The operations of block 1610 may be performed according to the methods described herein. In certain examples, aspects of the operations of block 1610 may be performed by a encoding component as described with reference to FIGS. 8 through 11.

At block 1615 the base station 105 may modulate the downlink transmission according to the first modulation order. The operations of block 1615 may be performed according to the methods described herein. In certain examples, aspects of the operations of block 1615 may be performed by a modulation component as described with reference to FIGS. 8 through 11.

At block 1620 the base station 105 may transmit the downlink transmission to the UE. The operations of block 1620 may be performed according to the methods described herein. In certain examples, aspects of the operations of block 1620 may be performed by a transmitter as described with reference to FIGS. 8 through 11.

Figure 17:
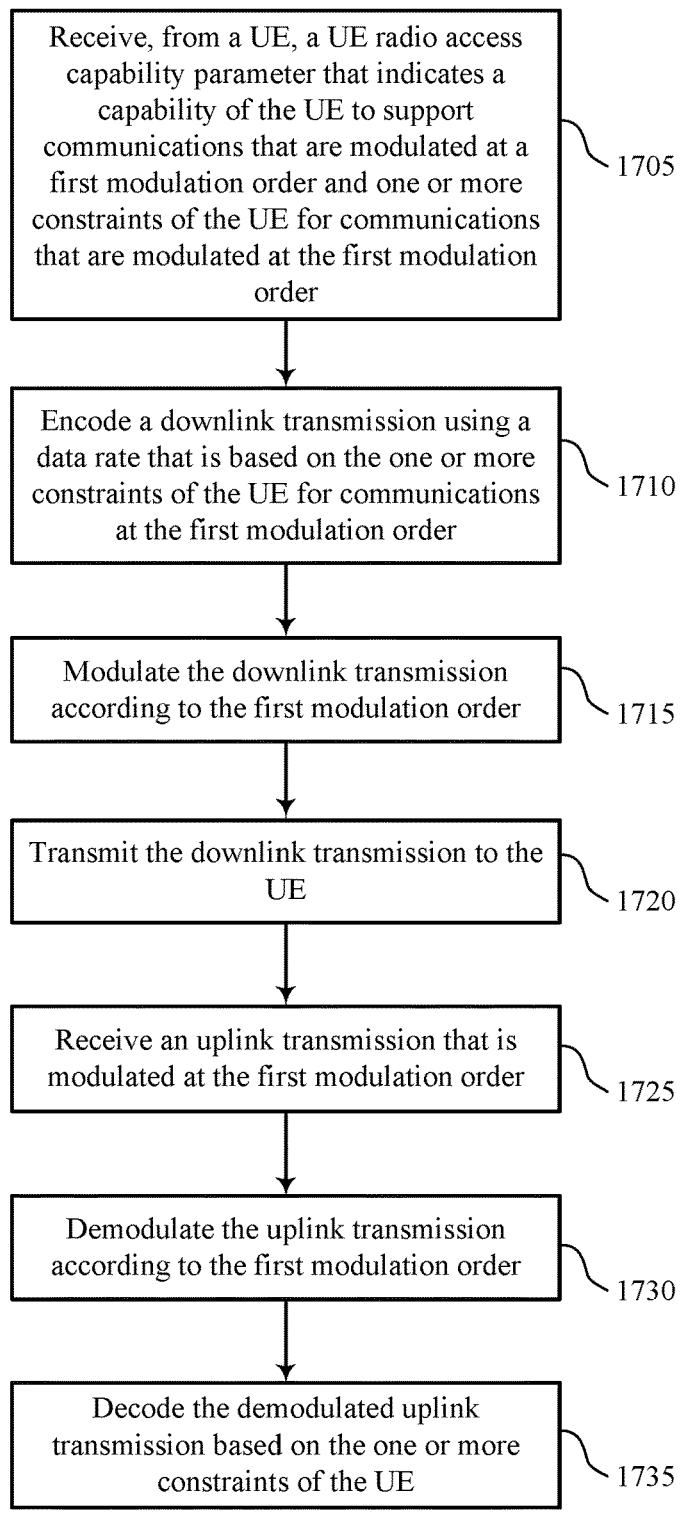

FIG. 17 shows a flowchart illustrating a method 1700 for UE capability constraint indications for high order modulation in accordance with aspects of the present disclosure. The method 1700 may be a method of wireless communication. The operations of method 1700 may be implemented by a base station 105 or its components as described herein. For example, the operations of method 1700 may be performed by a base station communications manager as described with reference to FIGS. 8 through 11. In some examples, a base station 105 may execute a set of codes to control the functional elements of the device to perform the functions described herein. Additionally or alternatively, the base station 105 may perform aspects of the functions described herein using special-purpose hardware.

At block 1705 the base station 105 may receive, from a UE, a UE radio access capability parameter that indicates a capability of the UE to support communications that are modulated at a first modulation order and one or more constraints of the UE for communications that are modulated at the first modulation order. The operations of block 1705 may be performed according to the methods described herein. In certain examples, aspects of the operations of block 1705 may be performed by a capability identification component as described with reference to FIGS. 8 through 11.

At block 1710 the base station 105 may encode a downlink transmission using a data rate that is based at least in part on the one or more constraints of the UE for communications at the first modulation order. The operations of block 1710 may be performed according to the methods described herein. In certain examples, aspects of the operations of block 1710 may be performed by a encoding component as described with reference to FIGS. 8 through 11.

At block 1715 the base station 105 may modulate the downlink transmission according to the first modulation order. The operations of block 1715 may be performed according to the methods described herein. In certain examples, aspects of the operations of block 1715 may be performed by a modulation component as described with reference to FIGS. 8 through 11.

At block 1720 the base station 105 may transmit the downlink transmission to the UE. The operations of block 1720 may be performed according to the methods described herein. In certain examples, aspects of the operations of block 1720 may be performed by a transmitter as described with reference to FIGS. 8 through 11.

At block 1725 the base station 105 may receive an uplink transmission that is modulated at the first modulation order. The operations of block 1725 may be performed according to the methods described herein. In certain examples, aspects of the operations of block 1725 may be performed by a receiver as described with reference to FIGS. 8 through 11.

At block 1730 the base station 105 may demodulate the uplink transmission according to the first modulation order. The operations of block 1730 may be performed according to the methods described herein. In certain examples, aspects of the operations of block 1730 may be performed by a demodulation component as described with reference to FIGS. 8 through 11.

At block 1735 the base station 105 may decode the demodulated uplink transmission based at least in part on the one or more constraints of the UE. The operations of block 1735 may be performed according to the methods described herein. In certain examples, aspects of the operations of block 1735 may be performed by a decoding component as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    identifying a capability of a UE to support communications that are modulated at a first modulation order, the first modulation order associated with a first maximum transport block size (TBS);
    identifying one or more constraints of the UE for the communications modulated at the first modulation order, wherein the one or more constraints indicate a second modulation order associated with a second maximum TBS smaller than the first maximum TBS, the second modulation order being a lower modulation order than the first modulation order;
    determining a UE radio access capability parameter that indicates the first modulation order is supported by the UE and that indicates the one or more constraints of the UE for the communications modulated at the first modulation order; and
    transmitting the UE radio access capability parameter to a base station.

2. The method of claim 1, wherein the UE radio access capability parameter indicates the one or more constraints of the UE on one or more frequency bands or combinations of frequency bands.

3. The method of claim 1, wherein the first modulation order is 256QAM and the second modulation order is 64QAM.

4. The method of claim 1, further comprising:
    decoding a demodulated downlink transmission based at least in part on the second maximum TBS.

5. The method of claim 1, further comprising:
    receiving a downlink transmission that is modulated at the first modulation order;
    demodulating the downlink transmission according to the first modulation order; and decoding the demodulated downlink transmission based at least in part on the one or more constraints of the UE.

6. The method of claim 1, further comprising:
encoding an uplink transmission using a data rate that is based at least in part on the one or more constraints of the UE for the communications at the first modulation order;
modulating the uplink transmission according to the first modulation order; and
transmitting the uplink transmission to the base station.

7. The method of claim 6, wherein the encoding further comprises:
identifying the second maximum TBS associated with the second modulation order based at least in part on the one or more constraints of the UE; and
encoding the uplink transmission based at least in part on the second maximum TBS.

8. The method of claim 7, wherein the first modulation order is 256QAM and the second modulation order is 64QAM.

9. The method of claim 1, wherein the one or more constraints indicate that the second maximum TBS associated with the second modulation order is to be used for the communications with the UE that are modulated at the first modulation order for all frequency bands and combinations of frequency bands supported by the UE.

10. The method of claim 1, the one or more constraints indicate that:
for a first frequency band, the second maximum TBS associated with the second modulation order is to be used for the communications with the UE that are modulated at the first modulation order, and
for a second frequency band, the first maximum TBS associated with the first modulation order is to be used for the communications with the UE that are modulated at the first modulation order.

11. The method of claim 10, wherein the first frequency band is a millimeter wave frequency band, and the second frequency band is a lower frequency band than the first frequency band.

12. The method of claim 1, further comprising:
rate matching a number of bits modulated using the first modulation order within a TBS to a number of bits that can be sent in a resource allocation based at least in part on a first rate matching associated with the first modulation order, a second rate matching associated with the second modulation order, or a combination thereof.

13. The method of claim 1, further comprising:
setting a soft buffer size based at least in part on the first modulation order, the second modulation order, the one or more constraints of the UE, or a combination thereof.

14. The method of claim 1, wherein the one or more constraints indicate the second modulation order as a supported modulation order for use in determining a data rate.

15. The method of claim 1, further comprising:
transmitting, to the base station, an indication of the second modulation order as a supported modulation order for use in determining a data rate.

16. A method for wireless communication, comprising:
receiving from a UE, at a base station, a UE radio access capability parameter that indicates a capability of the UE to support communications that are modulated at a first modulation order associated with a first maximum transport block size (TBS) and one or more constraints of the UE for the communications that are modulated at the first modulation order, wherein the one or more constraints indicate a second modulation order associated with a second maximum TBS smaller than the first maximum TBS, the second modulation order being a lower modulation order than the first modulation order;
encoding a downlink transmission using a data rate that is based at least in part on the one or more constraints of the UE for the communications at the first modulation order;
modulating the downlink transmission according to the first modulation order; and
transmitting the downlink transmission to the UE.

17. The method of claim 16, wherein the UE radio access capability parameter indicates the one or more constraints of the UE on one or more frequency bands or combinations of frequency bands.

18. The method of claim 16, wherein the first modulation order is 256QAM and the second modulation order is 64QAM.

19. The method of claim 16, wherein the encoding further comprises:
identifying the second maximum TBS associated with the second modulation order based at least in part on the one or more constraints of the UE; and
encoding the downlink transmission based at least in part on the second maximum TBS.

20. The method of claim 16, further comprising:
receiving an uplink transmission that is modulated at the first modulation order;
demodulating the uplink transmission according to the first modulation order; and
decoding the demodulated uplink transmission based at least in part on the one or more constraints of the UE.

21. The method of claim 20, wherein the decoding further comprises:
identifying the second maximum TBS associated with the second modulation order based at least in part on the one or more constraints of the UE; and
decoding the demodulated uplink transmission based at least in part on the second maximum TBS.

22. The method of claim 16, wherein the one or more constraints indicate that the second maximum TBS associated with the second modulation order is to be used for the communications with the UE that are modulated at the first modulation order.

23. The method of claim 16, wherein the one or more constraints indicate that:
for a first frequency band, the second maximum TBS of associated with the second modulation order is to be used for the communications with the UE that are modulated at the first modulation order, and
for a second frequency band, the first maximum TBS associated with the first modulation order is to be used for the communications with the UE that are modulated at the first modulation order.

24. The method of claim 23, wherein the first frequency band is a millimeter wave frequency band, and the second frequency band is a lower frequency band than the first frequency band.

25. An apparatus for wireless communication, comprising:
a processor;
memory in electronic communication with the processor; and
instructions stored in the memory and operable, when executed by the processor, to cause the apparatus to:
identify a capability of a UE to support communications that are modulated at a first modulation order, the first modulation order associated with a first maximum transport block size (TBS);

identify one or more constraints of the UE for the communications modulated at the first modulation order, wherein the one or more constraints indicate a second modulation order associated with a second maximum TBS smaller than the first maximum TBS, the second modulation order being a lower modulation order than the first modulation order;

determine a UE radio access capability parameter that indicates the first modulation order is supported by the UE and that indicates the one or more constraints of the UE for the communications modulated at the first modulation order; and transmit the UE radio access capability parameter to a base station.

26. The apparatus of claim 25, wherein the UE radio access capability parameter indicates the one or more constraints of the UE on one or more frequency bands or combinations of frequency bands.

27. An apparatus for wireless communication, comprising:
a processor;
memory in electronic communication with the processor; and
instructions stored in the memory and operable, when executed by the processor, to cause the apparatus to:
receive from a UE, at a base station, a UE radio access capability parameter that indicates a capability of the UE to support communications that are modulated at a first modulation order associated with a first maximum transport block size (TBS) and one or more constraints of the UE for the communications that are modulated at the first modulation order, wherein the one or more constraints indicate a second modulation order associated with a second maximum TBS smaller than the first maximum TBS, the second modulation order being a lower modulation order than the first modulation order;

encode a downlink transmission using a data rate that is based at least in part on the one or more constraints of the UE for the communications at the first modulation order;

modulate the downlink transmission according to the first modulation order; and transmit the downlink transmission to the UE.

28. The apparatus of claim 27, wherein the UE radio access capability parameter indicates the one or more constraints of the UE on one or more frequency bands or combinations of frequency bands.

* * * * *